US012152144B2

(12) United States Patent
Hu et al.

(10) Patent No.: US 12,152,144 B2
(45) Date of Patent: Nov. 26, 2024

(54) COPOLYMER, METHOD OF PREPARING THE SAME, RESIN COMPOSITION AND ARTICLE MADE THEREFROM

(71) Applicant: Elite Electronic Material (Zhongshan) Co., Ltd., Zhongshan (CN)

(72) Inventors: Zhilong Hu, Zhongshan (CN); Xiangnan Li, Zhongshan (CN); Hongxia Peng, Zhongshan (CN); Hezong Zhang, Zhongshan (CN); Bangjun Lan, Zhongshan (CN)

(73) Assignee: Elite Electronic Material (Zhongshan) Co., Ltd., Zhongshan (CN)

( * ) Notice: Subject to any disclaimer, the term of this patent is extended or adjusted under 35 U.S.C. 154(b) by 363 days.

(21) Appl. No.: 17/871,593

(22) Filed: Jul. 22, 2022

(65) Prior Publication Data

US 2023/0416527 A1 Dec. 28, 2023

(30) Foreign Application Priority Data

Jun. 22, 2022 (CN) ......................... 202210712991.0

(51) Int. Cl.
*C08L 71/12* (2006.01)

(52) U.S. Cl.
CPC ......... *C08L 71/126* (2013.01); *C08L 2205/03* (2013.01)

(58) Field of Classification Search
CPC .. C08F 230/085; C08F 212/36; C08F 212/08; C08L 71/12
See application file for complete search history.

(56) References Cited

U.S. PATENT DOCUMENTS 3,624,057 A * 11/1971 Farrar .................. C07F 9/5013 502/157
2015/0152205 A1* 6/2015 Kim ..................... C08F 212/10 526/279

* cited by examiner

*Primary Examiner* — Mark S Kaucher
(74) *Attorney, Agent, or Firm* — Muncy, Geissler, Olds & Lowe, P.C.

(57) ABSTRACT

A phenylvinylsilane-divinylbenzene-styrene terpolymer is prepared by copolymerizing 50 parts by weight to 70 parts by weight of phenylvinylsilane, 10 parts by weight to 20 parts by weight of divinylbenzene and 20 parts by weight to 30 parts by weight of styrene, the total amount of phenylvinylsilane, divinylbenzene and styrene being 100 parts by weight, wherein the phenylvinylsilane has a structure of Formula (I) or Formula (II). Moreover, a resin composition includes a phenylvinylsilane-divinylbenzene-styrene terpolymer and a vinyl group-containing polyphenylene ether resin. The resin composition may be used to make various articles, such as a prepreg, a resin film, a laminate or a printed circuit board.

17 Claims, 4 Drawing Sheets

Copolymer 2
polyphenyltrivinylsilane
polystyrene
8.0 7.5 7.0 6.5 6.0 5.5 5.0 4.5 4.0 3.5 3.0 2.5 2.0 1.5 1.0 0.5 0.0
f1(ppm)

| | Dist Name | Elution Volume (ml) | Retention Time (min) | Adjusted RT (min) | Mn | Mw | MP | Mz | Mz+1 | Mz/Mw | Mz+1/Mw |
|---|---|---|---|---|---|---|---|---|---|---|---|
| 1 | | 20.285 | 20.285 | 20.285 | 16703 | 21228 | 13832 | 29103 | 41497 | 1.370932 | 1.954798 |
| 2 | | 21.572 | 21.572 | 21.572 | 3153 | 4707 | 7314 | 5767 | 6471 | 1.225303 | 1.374820 |

COPOLYMER, METHOD OF PREPARING THE SAME, RESIN COMPOSITION AND ARTICLE MADE THEREFROM

CROSS-REFERENCE TO RELATED APPLICATION

This application claims the priority benefits of China Patent Application No. 202210712991.0, filed on Jun. 22, 2022. The entirety the above-mentioned patent application is hereby incorporated by reference herein and made a part of this specification.

BACKGROUND

1. Field of the Disclosure

The present disclosure mainly relates to a copolymer and more particularly to a copolymer comprising a structure unit formed by phenylvinylsilane, divinylbenzene and styrene, which is useful for preparing an article such as a prepreg, a resin film, a laminate or a printed circuit board.

2. Description of Related Art

Recently, the electronic technology has been developed towards higher density, lower power consumption and higher performance, thereby presenting more challenges to the high performance electronic materials.

With the advent of the 5G generation, enterprises not only need to continuously improve the overall performance of electronic materials, but also need to balance the relationship between performance of electronic materials and cost in order to meet the challenges brought about by continuous technological advancement.

In the manufacture of copper-clad laminate materials, when the conventional material phenylvinylsilane is used, it is easy to volatilize due to heating at high temperature, which not only causes the waste of expensive materials, but also causes the properties of copper-clad laminate materials to change, failing to achieve the demands in properties. Therefore, in order to reduce its volatility, reduce the cost of copper-clad laminate materials and improve the overall performance of copper-clad laminate materials, inventors have carried out related researches on such as the improvement of one or more properties including glass transition temperature, copper foil peeling strength, dissipation factor or inner resin flow.

SUMMARY

To overcome the problems of prior arts, particularly one or more above-mentioned property demands facing conventional materials, it is a primary object of the present disclosure to provide a copolymer, which may overcome at least one of the above-mentioned technical problems and is a phenylvinylsilane-divinylbenzene-styrene terpolymer, and to provide a method of making a phenylvinylsilane-divinylbenzene-styrene terpolymer. In addition, the present disclosure further provides a resin composition and an article made therefrom which may overcome at least one of the above-mentioned technical problems. Specifically, the present disclosure provides a copolymer, a resin composition or an article made therefrom, which may achieve improvement in one or more of the properties including glass transition temperature, copper foil peeling strength, dissipation factor, inner resin flow, branch-like pattern or thermal resistance after moisture absorption (PCT).

To achieve the aforesaid one or more objects, in one aspect, the present disclosure provides a phenylvinylsilane-divinylbenzene-styrene terpolymer prepared by copolymerizing 50 parts by weight to 70 parts by weight of phenylvinylsilane, 10 parts by weight to 20 parts by weight of divinylbenzene and 20 parts by weight to 30 parts by weight of styrene, the total amount of phenylvinylsilane, divinylbenzene and styrene being 100 parts by weight, wherein the phenylvinylsilane has a structure of Formula (I) or Formula (II):

Formula (I)

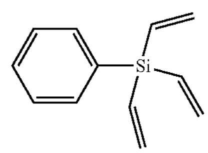

Formula (II)

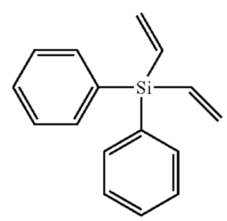

For example, in one embodiment, the phenylvinylsilane-divinylbenzene-styrene terpolymer has a volatilization percentage of between 40% and 60%.

For example, in one embodiment, the phenylvinylsilane-divinylbenzene-styrene terpolymer has a content of phenylvinylsilane structure unit of 30 mol % to 50 mol %.

For example, in one embodiment, the phenylvinylsilane-divinylbenzene-styrene terpolymer comprises a structure unit of Formula (a) and a structure unit of Formula (b) and further comprises any one or more of structure units of Formula (c), Formula (d), Formula (e) and Formula (f):

Formula (a)

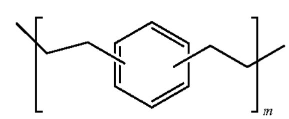

Formula (b)

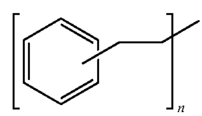

Formula (c)

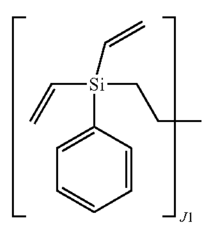

-continued

Formula (d)

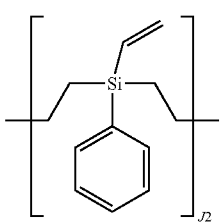

Formula (e)

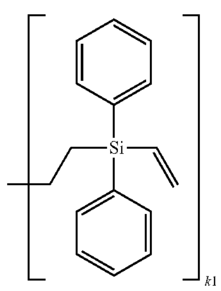

Formula (f)

wherein m is an integer of 2 to 45, n is an integer of 5 to 86, J1 and J2 are independently an integer of 3 to 81, and k1 and k2 are independently an integer of 3 to 65.

For example, in one embodiment, the phenylvinylsilane-divinylbenzene-styrene terpolymer has a weight average molecular weight of between 3000 and 30000.

In another aspect, the present disclosure provides a method of making the phenylvinylsilane-divinylbenzene-styrene terpolymer, comprising reacting 50 parts by weight to 70 parts by weight of phenylvinylsilane, 10 parts by weight to 20 parts by weight of divinylbenzene and 20 parts by weight to 30 parts by weight of styrene at 70° C. to 130° C. for 3 hours to 14 hours.

In another aspect, the present disclosure provides a resin composition, comprising 30 parts by weight to 50 parts by weight of the phenylvinylsilane-divinylbenzene-styrene terpolymer and 100 parts by weight of a vinyl group-containing polyphenylene ether resin.

For example, in one embodiment, the resin composition further comprises a maleimide resin, a maleimide triazine resin, an unsaturated polyolefin resin, a hydrogenated unsaturated polyolefin resin, a small molecule vinyl group-containing resin, a styrene maleic anhydride resin, an epoxy resin, a phenolic resin, a benzoxazine resin, a cyanate ester resin, a polyester resin, a polyamide resin, a polyimide resin or a combination thereof. The term "further comprise" means "also comprise".

For example, in one embodiment, the small molecule vinyl group-containing resin comprises styrene, divinylbenzene, bis(vinylbenzyl)ether, 1,2,4-trivinyl cyclohexane, bis(vinylphenyl)ethane, bis(vinylphenyl)hexane, bis(vinylphenyl) dimethyl ether, bis(vinylphenyl) dimethyl benzene, triallyl isocyanurate, triallyl cyanurate, a prepolymer of any one of the foregoing components or a combination thereof.

For example, in one embodiment, the vinyl group-containing polyphenylene ether resin comprises a vinylbenzyl-terminated polyphenylene ether resin, a methacrylate-terminated polyphenylene ether resin or a combination thereof.

For example, in one embodiment, the vinylbenzyl-terminated polyphenylene ether resin and the methacrylate-terminated polyphenylene ether resin respectively comprise a structure of Formula (III) and a structure of Formula (IV):

Formula (III)

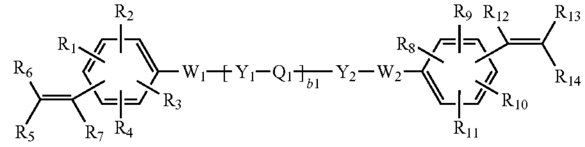

Formula (IV)

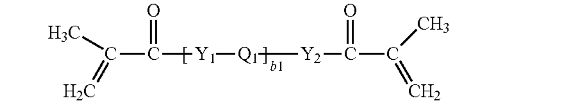

wherein $R_1$ to $R_{14}$ are individually H or $—CH_3$, and $W_1$ and $W_2$ are individually a $C_1$ to $C_3$ bivalent aliphatic group;

b1 is an integer of 0 to 8;

$Q_1$ comprises a structure of any one of Formula (B-1) to Formula (B-3) or a combination thereof:

Formula (B-1)

Formula (B-2)

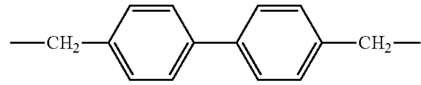

Formula (B-3)

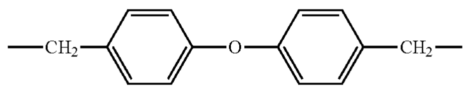

$Y_1$ and $Y_2$ independently comprise a structure of Formula (B-4):

Formula (B-4)

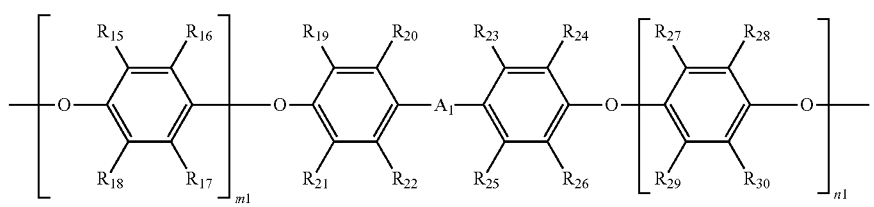

wherein $R_{15}$ to $R_{30}$ are independently H or $—CH_3$; m1 and n1 independently represent an integer of 1 to 30; and $A_1$ is selected from a covalent bond, $—CH_2—$, $—CH(CH_3)—$, $—C(CH_3)_2—$, —O—, —S—, $—SO_2—$ and a carbonyl group.

For example, in one embodiment, the resin composition further comprises amine curing agent, flame retardant, inorganic filler, curing accelerator, polymerization inhibitor, coloring agent, solvent, toughening agent, silane coupling agent or a combination thereof.

In another aspect, the present disclosure provides an article made from the resin composition described above, which comprises a prepreg, a resin film, a laminate or a printed circuit board.

For example, in one embodiment, articles made from the resin composition disclosed herein have one, more or all of the following properties:

- a glass transition temperature as measured by using dynamic mechanical analysis by reference to IPC-TM-650 2.4.24.4 of greater than or equal to 220° C.;
- a copper foil peeling strength as measured by reference to IPC-TM-650 2.4.8 of greater than or equal to 3.50 lb/in;
- a dissipation factor at 10 GHz as measured by reference to JIS C2565 of less than or equal to 0.00350; and
- an inner resin flow after lamination of the article of greater than or equal to 15.0 mm.

DESCRIPTION OF THE EMBODIMENTS

Figure 1:
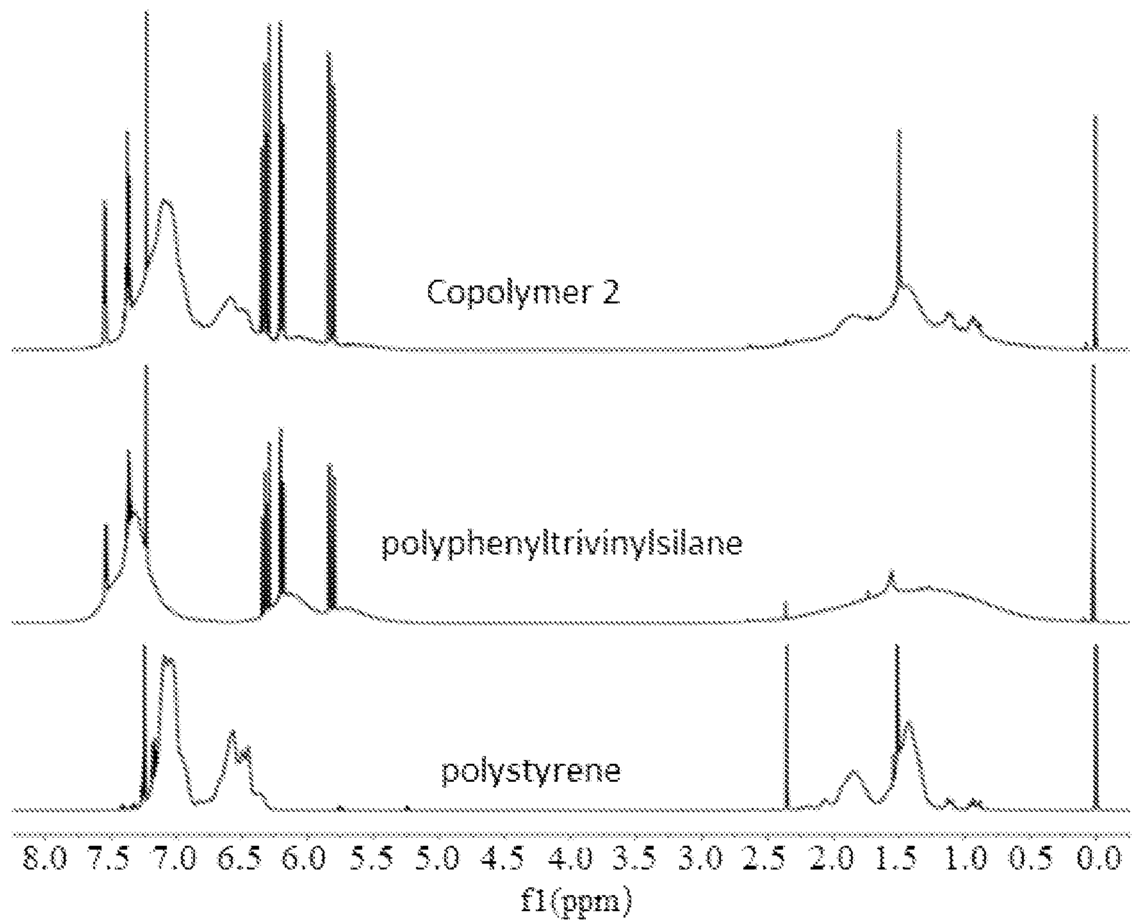
FIG. 1 illustrates 1H-NMR spectra of Copolymer 2, polyphenyltrivinylsilane and polystyrene.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompasses," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture.

Further, unless expressly stated to the contrary, the term "or" refers to an inclusive or and not to an exclusive or. For example, a condition "P or Q" is satisfied by any one of the following: P is true (or present) and Q is false (or not present), P is false (or not present) and Q is true (or present), and both P and Q are true (or present). In addition, whenever open-ended transitional phrases are used, such as "comprises," "comprising," "includes," "including," "encompasses," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of X1, X2 and X3," it is intended to disclose the situations of X is X1 and X is X1 and/or X2 and/or X3. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of X1, X2 and X3" and Y is described as being "selected from a group consisting of Y1, Y2 and Y3," the disclosure includes any combination of X is X1 or X2 or X3 and Y is Y1 or Y2 or Y3. As used herein, "or a combination thereof" means "or any combination thereof".

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer (a small molecule compound of maleimide), a maleimide polymer, a combination of maleimide monomers, a combination of maleimide polymers or a combination of maleimide monomer(s) and maleimide polymer(s).

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture may include two or more compounds and may include a copolymer or auxiliaries, but not limited thereto.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto.

A homopolymer refers to a chemical substance formed by a single compound via polymerization, addition polymerization or condensation polymerization. A copolymer refers to a chemical substance formed by two or more compounds via polymerization, addition polymerization or condensation polymerization and may comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. Unless otherwise specified, the copolymer of the present disclosure refers to a polymer obtained by copolymerizing phenylvinylsilane, divinylbenzene and styrene monomers. As long as the copolymer of the present disclosure is a copolymer containing phenylvinylsilane, divinylbenzene, and styrene fragments at the same time, whether the units of the polymer main chain skeleton and side chain are modified or not is not particularly limited. In other words, the phenylvinylsilane-divinylbenzene-styrene terpolymer of the present disclosure should be construed as including both unmodified and modified situations.

Unless otherwise specified, according to the present disclosure, a prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured.

The term "polymer" includes but is not limited to an oligomer. An oligomer refers to a polymer with 2-20, typically 2-5, repeating units.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

Unless otherwise specified, an alkyl group, an alkenyl group and a hydrocarbyl group described herein are construed to encompass various isomers thereof. For example, a propyl group is construed to encompass n-propyl and iso-propyl.

Unless otherwise specified, as used herein, "vinyl group-containing" refers to the presence of an ethylenic carbon-carbon double bond (C═C) or a functional group derived therefrom in a compound. Therefore, examples of "vinyl group-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl group-containing polyphenylene ether resin represents a polyphenylene ether resin containing a vinyl group, an allyl group, a vinylbenzyl group, a methacrylate group or the like, but not limited thereto.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

As used herein, part(s) by weight represents weight part(s) in any weight unit, such as but not limited to kilogram, gram, pound and so on. For example, 100 parts by weight of a vinyl group-containing polyphenylene ether resin may represent 100 kilograms of the vinyl group-containing polyphenylene ether resin or 100 pounds of the vinyl group-containing polyphenylene ether resin.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

As described above, it is a primary object of the present disclosure to provide a phenylvinylsilane-divinylbenzene-styrene terpolymer (abbreviated as "copolymer"), prepared by copolymerizing 50 parts by weight to 70 parts by weight of phenylvinylsilane, 10 parts by weight to 20 parts by weight of divinylbenzene and 20 parts by weight to 30 parts by weight of styrene, the total amount of phenylvinylsilane, divinylbenzene and styrene being 100 parts by weight, wherein the phenylvinylsilane has a structure of Formula I or Formula (II):

Formula (I)

Formula (II)

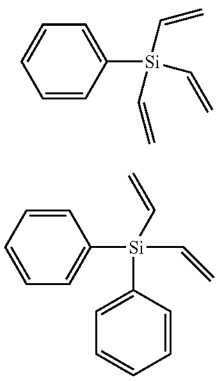

In one embodiment, for example, the divinylbenzene comprises an ortho-divinylbenzene, a meta-divinylbenzene, a para-divinylbenzene or a combination thereof.

In one embodiment, for example, the total parts by weight of phenylvinylsilane, divinylbenzene and styrene is 100 parts by weight, wherein the phenylvinylsilane is 50 parts by weight to 70 parts by weight, such as but not limited to 50 parts by weight, 60 parts by weight or 70 parts by weight; the divinylbenzene is 10 parts by weight to 20 parts by weight, such as but not limited to 10 parts by weight, 15 parts by weight or 20 parts by weight; the styrene is 20 parts by weight to 30 parts by weight, such as but not limited to 20 parts by weight, 25 parts by weight or 30 parts by weight. In one embodiment, for example, the parts by weight of phenylvinylsilane, divinylbenzene and styrene are respectively 50 parts by weight, 20 parts by weight and 30 parts by weight. In one embodiment, for example, the parts by weight of phenylvinylsilane, divinylbenzene and styrene are respectively 60 parts by weight, 10 parts by weight and 30 parts by weight. In one embodiment, for example, the parts by weight of phenylvinylsilane, divinylbenzene and styrene are respectively 60 parts by weight, 15 parts by weight and 25 parts by weight. In one embodiment, for example, the parts by weight of phenylvinylsilane, divinylbenzene and styrene are respectively 70 parts by weight, 10 parts by weight and 20 parts by weight.

The copolymer of the present disclosure obtained by copolymerizing phenylvinylsilane, divinylbenzene and styrene achieves several advantages compared to phenylvinylsilane.

For example, in one embodiment, the phenylvinylsilane-divinylbenzene-styrene terpolymer of the present disclosure has the following advantages:

(1) During a volatilization percentage test, 2 g of resin (phenylvinylsilane, divinylbenzene or styrene) or copolymer was weighed in a tray and baked in a 170° C. oven for 1 hour. After cooling, the weight m was measured to calculate the volatilization percentage as [(2−m)/2]*100%. Surprisingly, compared to the raw materials phenylvinylsilane, divinylbenzene and styrene, the volatility of the phenylvinylsilane-divinylbenzene-styrene terpolymer disclosed herein is significantly reduced, such as having a volatilization percentage of between 40% and 60%, such as a volatilization percentage of 40%, 45%, 50%, 55% or 60%, but not limited thereto. The data related to volatilization percentage are as follows:

| resin or copolymer | volatilization percentage (%) |
|---|---|
| copolymer (phenyltrivinylsilane:divinylbenzene:styrene = 50:20:30) | 47 |
| copolymer (phenyltrivinylsilane:divinylbenzene:styrene = 60:10:30) | 51 |
| copolymer (phenyltrivinylsilane:divinylbenzene:styrene = 60:15:25) | 46 |
| copolymer (phenyltrivinylsilane:divinylbenzene:styrene = 70:10:20) | 53 |
| copolymer (diphenyldivinylsilane:divinylbenzene:styrene = 60:10:30) | 50 |
| phenyltrivinylsilane | >98 |
| diphenyldivinylsilane | >98 |
| styrene | >99 |
| divinylbenzene | >99 |

(2) Compared to the expensive phenylvinylsilane, the cost of phenylvinylsilane-divinylbenzene-styrene terpolymer is reduced by more than about 30%.

(3) Compared to the phenylvinylsilane, the phenylvinylsilane-divinylbenzene-styrene terpolymer added in the resin composition may at the same time improve glass transition temperature and copper foil peeling strength of the article made therefrom.

In one embodiment, for example, the phenylvinylsilane-divinylbenzene-styrene terpolymer of the present disclosure has a content of phenylvinylsilane structure unit of 30 mol % to 50 mol %.

In one embodiment, for example, the phenylvinylsilane-divinylbenzene-styrene terpolymer of the present disclosure comprises a structure unit of Formula (a) (from divinylbenzene) and a structure unit of Formula (b) (from styrene) and further comprises any one or more of structure units of Formula (c), Formula (d), Formula (e) and Formula (f) (from phenylvinylsilane):

Formula (a)

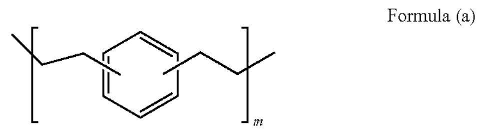

Formula (b)

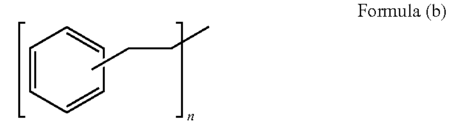

Formula (c)

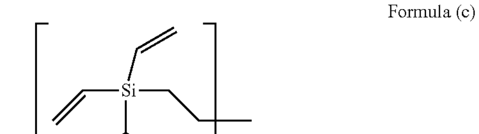

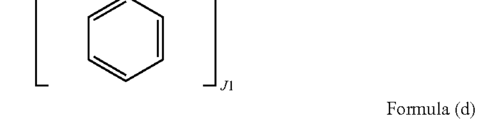

Formula (d)

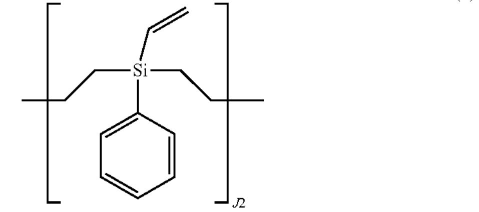

-continued

Formula (e)

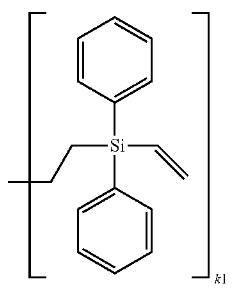

Formula (f)

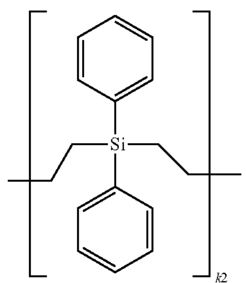

wherein m is an integer of 2 to 45, n is an integer of 5 to 86, J1 and J2 are independently an integer of 3 to 81, and k1 and k2 are independently an integer of 3 to 65.

The molecular weight of the phenylvinylsilane-divinylbenzene-styrene terpolymer described herein is not particularly limited. In one embodiment, for example, the weight average molecular weight of the phenylvinylsilane-divinylbenzene-styrene terpolymer may be between 3000 and 30000, such as but not limited to 3000, 10000, 15000, 20000, 25000 or 30000, such as a weight average molecular weight of 21228.

Another main object of the present disclosure is to provide a method of making the aforesaid phenylvinylsilane-divinylbenzene-styrene terpolymer, comprising reacting 50 parts by weight to 70 parts by weight of phenylvinylsilane, 10 parts by weight to 20 parts by weight of divinylbenzene and 20 parts by weight to 30 parts by weight of styrene at 70° C. to 130° C. for 3 hours to 14 hours.

For example, in one embodiment, the heating time may range from 3 hours to 14 hours, such as between 4 hours and 13 hours, between 5 hours and 12 hours, between 6 hours and 11 hours, between 7 hours and 10 hours or between 8 hours and 9 hours.

The reaction temperature may range from 70° C. to 130° C., such as between 80° C. and 120° C., between 90° C. and 110° C. or between 100° C. and 120° C.

For example, in one embodiment, during the reaction, a catalyst, a free radical initiator or a combination thereof may be used, such as but not limited to α,α'-bis(tert-butylperoxy-m-isopropyl)benzene, 2,3-dimethyl-2,3-diphenylbutane, 2,5-dimethyl-2,5-di(tert-butylperoxy)-3-hexyne, benzoyl peroxide, 3,3',5,5'-tetramethyl-1,4-diphenoxyquinone, chloroquinone, 2,4,6-tri-tert-butylphenol, tert-butyl peroxyisopropyl carbonate, azobisisobutylonitrile or a combination thereof. In addition, in one embodiment, during the reaction, a metal carboxylate may also be used. The amount of the catalyst, the free radical initiator or a combination thereof may be 0.5% to 1.0% of the total amount (in part by weight) of phenylvinylsilane, divinylbenzene and styrene, such as between 0.6% and 0.9% or between 0.7% and 0.8%.

For example, in one embodiment, the copolymers of the present disclosure (i.e., phenylvinylsilane-divinylbenzene-styrene terpolymer) are prepared as follows:

Preparation Example 1

In the presence of nitrogen gas protection, 50 parts by weight of phenyltrivinylsilane, 20 parts by weight of divinylbenzene, 30 parts by weight of styrene and 0.6 part by weight of 2,5-dimethyl-2,5-di(t-butylperoxy)-3-hexyne (abbreviated as 25B below) were added to a three-necked flask, heated to the temperature of 90° C. to 110° C., and stirred and reacted for 5 hours to 8 hours. After the reaction was completed, the mixture was cooled to room temperature to obtain Product 1, which was then dropped into methanol for precipitation and filtration to obtain White Solid 1. The White Solid 1 was placed in a vacuum drying oven at 50° C. to 70° C. for 6 hours to 12 hours to obtain White Solid 2 (i.e., Product 2) as Copolymer 1, having a content of phenyltrivinylsilane structure unit of 32 mol % and being the phenylvinylsilane-divinylbenzene-styrene terpolymer of the present disclosure.

Preparation Example 2

60 parts by weight of phenyltrivinylsilane, 10 parts by weight of divinylbenzene, 30 parts by weight of styrene and 0.6 part by weight of 25B were added to a three-necked flask, and the remaining steps were the same as Preparation Example 1. Copolymer 2 thus obtained has a content of phenyltrivinylsilane structure unit of 36 mol % and is the phenylvinylsilane-divinylbenzene-styrene terpolymer of the present disclosure.

Preparation Example 3

60 parts by weight of phenyltrivinylsilane, 15 parts by weight of divinylbenzene, 25 parts by weight of styrene and 0.6 part by weight of 25B were added to a three-necked flask, and the remaining steps were the same as Preparation Example 1. Copolymer 3 thus obtained has a content of phenyltrivinylsilane structure unit of 38 mol % and is the phenylvinylsilane-divinylbenzene-styrene terpolymer of the present disclosure.

Preparation Example 4

70 parts by weight of phenyltrivinylsilane, 10 parts by weight of divinylbenzene, 20 parts by weight of styrene and 0.6 part by weight of 25B were added to a three-necked flask, and the remaining steps were the same as Preparation Example 1. Copolymer 4 thus obtained has a content of phenyltrivinylsilane structure unit of 44 mol % and is the phenylvinylsilane-divinylbenzene-styrene terpolymer of the present disclosure.

Preparation Example 5

60 parts by weight of diphenyldivinylsilane, 10 parts by weight of divinylbenzene, 30 parts by weight of styrene and 0.6 part by weight of 25B were added to a three-necked flask, and the remaining steps were the same as Preparation Example 1. Copolymer 5 thus obtained has a content of diphenyldivinylsilane structure unit of 36 mol % and is the phenylvinylsilane-divinylbenzene-styrene terpolymer of the present disclosure.

FIG. 1 illustrates 1H-NMR spectra of Copolymer 2, polyphenyltrivinylsilane and polystyrene (standard material: TMS tetramethylsilane), wherein the 1H-NMR spectrum of Copolymer 2 is on the top, the 1H-NMR spectrum of polyphenyltrivinylsilane is in the middle, and the 1H-NMR spectrum of polystyrene is at the bottom. Because divinylbenzene or styrene is prone to homopolymerization in a high temperature environment, and phenyltrivinylsilane may cause homopolymerization in the presence of an initiator in a high temperature environment, the 1H-NMR spectra of their homopolymers are used to exclude the possibility of homopolymerization of the raw materials to form homopolymers in the present disclosure.

In the 1H-NMR spectrum of polystyrene at the bottom, there is a C—H peak representing the polystyrene main chain bonded to the benzene ring at about 2.4 ppm. In the 1H-NMR spectrum of polyphenyltrivinylsilane in the middle, a C═C double bond peak appears at 5.5-6.5 ppm. Because polydivinylbenzene has a network crosslinking structure and is unable to be dissolved in the deuterated chloroform ($CDCl_3$) solvent, its 1H-NMR spectrum cannot be measured. However, the position of occurrence of the C—H peak representing the polydivinylbenzene bonded to the benzene ring in the main chain is not much different from the position of occurrence of the C—H peak in polystyrene. It can be observed by comparison that a C═C double bond peak appears at 5.5-6.5 ppm in the 1H-NMR spectrum of Copolymer 2, and the characteristic peaks of polystyrene (polydivinylbenzene) appear in the C—H saturated bond region at 1.0-2.0 ppm and in the benzene ring region, indicating that the raw materials phenyltrivinylsilane, divinylbenzene and styrene were copolymerized to generate Copolymer 2, which is the phenylvinylsilane-divinylbenzene-styrene terpolymer of the present disclosure.

Figure 2:
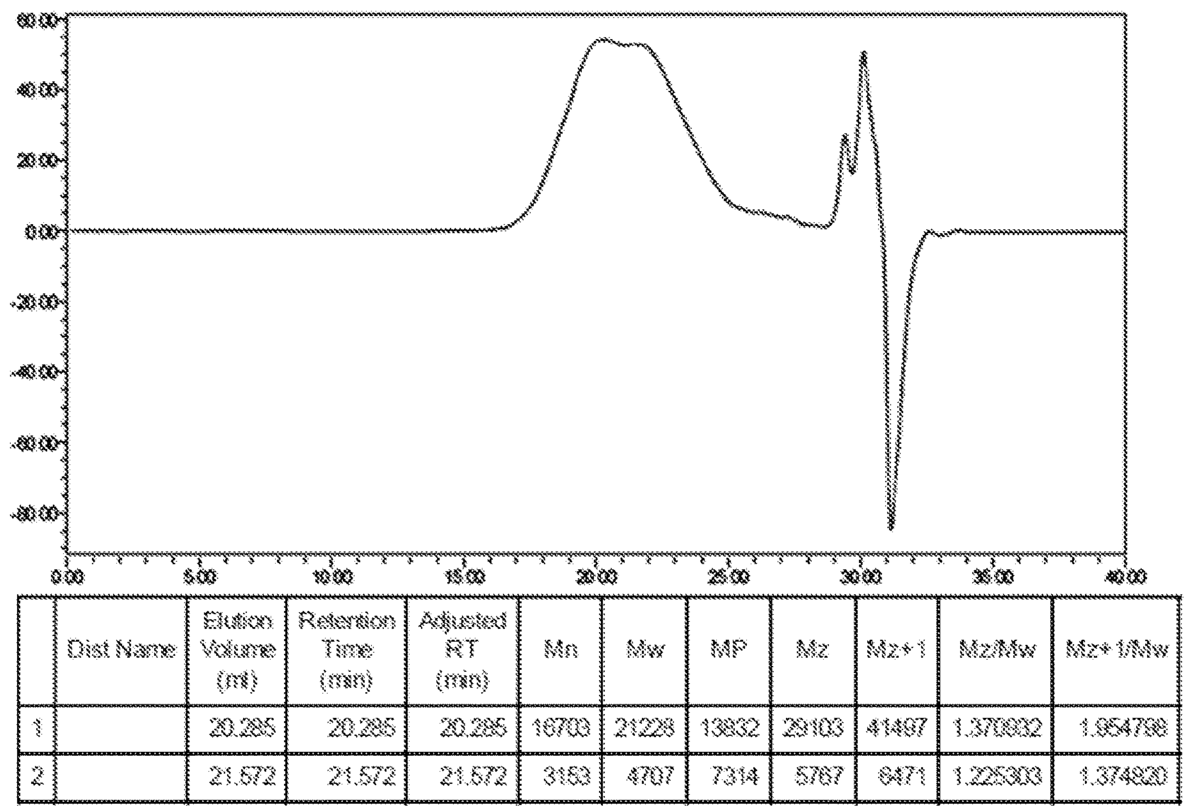
FIG. 2 illustrates a gel permeation chromatography (GPC) spectrum of Copolymer 2.

FIG. 2 illustrates a gel permeation chromatography (GPC) spectrum of Copolymer 2. It is confirmed by testing that the weight average molecular weight of Copolymer 2 is 21228, which proves that the weight average molecular weight of Copolymer 2 is significantly greater than the molecular weight of its raw material monomers (i.e., phenylvinylsilane, divinylbenzene and styrene). Therefore, Copolymer 2 is surely obtained from a copolymerization reaction.

Comparative Preparation Example 1

35 parts by weight of phenyltrivinylsilane, 25 parts by weight of divinylbenzene, 40 parts by weight of styrene and 0.6 part by weight of 25B were added to a three-necked flask, and the remaining steps were the same as Preparation Example 1 to obtain Comparative Copolymer 1.

Comparative Preparation Example 2

80 parts by weight of phenyltrivinylsilane, 5 parts by weight of divinylbenzene, 15 parts by weight of styrene and 0.6 part by weight of 25B were added to a three-necked flask, and the remaining steps were the same as Preparation Example 1 to obtain Comparative Copolymer 2.

Comparative Preparation Example 3

35 parts by weight of diphenyldivinylsilane, 25 parts by weight of divinylbenzene, 40 parts by weight of styrene and 0.6 part by weight of 25B were added to a three-necked flask, and the remaining steps were the same as Preparation Example 1 to obtain Comparative Copolymer 3.

Comparative Preparation Example 4

60 parts by weight of phenyltrivinylsilane, 40 parts by weight of divinylbenzene and 0.6 part by weight of 25B were added to a three-necked flask, and the remaining steps were the same as Preparation Example 1 to obtain Comparative Copolymer 4.

Comparative Preparation Example 5

60 parts by weight of diphenyldivinylsilane, 40 parts by weight of divinylbenzene and 0.6 part by weight of 25B were added to a three-necked flask, and the remaining steps were the same as Preparation Example 1 to obtain Comparative Copolymer 5.

Comparative Preparation Example 6

60 parts by weight of phenyltrivinylsilane, 40 parts by weight of styrene and 0.6 part by weight of 25B were added to a three-necked flask, and the remaining steps were the same as Preparation Example 1 to obtain Comparative Copolymer 6.

Comparative Preparation Example 7

60 parts by weight of diphenyldivinylsilane, 40 parts by weight of styrene and 0.6 part by weight of 25B were added to a three-necked flask, and the remaining steps were the same as Preparation Example 1 to obtain Comparative Copolymer 7.

Comparative Preparation Example 8

60 parts by weight of allyltrimethylsilane, 10 parts by weight of divinylbenzene, 30 parts by weight of styrene and 0.6 part by weight of 25B were added to a three-necked flask, and the remaining steps were the same as Preparation Example 1 to obtain Comparative Copolymer 8.

Comparative Preparation Example 9

60 parts by weight of diphenyldivinylsilane, 40 parts by weight of styrene-butadiene copolymer (Ricon 100, available from Cray Valley) and 0.6 part by weight of 25B were added to a three-necked flask, and the remaining steps were the same as Preparation Example 1 to obtain Comparative Copolymer 9.

Comparative Preparation Example 10

60 parts by weight of divinylbenzene, 40 parts by weight of styrene and 0.6 part by weight of 25B were added to a three-necked flask, and the remaining steps were the same as Preparation Example 1 to obtain Comparative Copolymer 10.

Comparative Preparation Example 11

5 parts by weight of divinylbenzene, 15 parts by weight of styrene and 0.12 part by weight of 25B were added to a three-necked flask, and the remaining steps were the same as Preparation Example 1 to obtain Comparative Copolymer 11.

Comparative Preparation Example 12

60 parts by weight of phenyltrivinylsilane, 40 parts by weight of a methacrylate and 0.6 part by weight of 25B were added to a three-necked flask, and the remaining steps were the same as Preparation Example 1 to obtain Comparative Copolymer 12.

Another main object of the present disclosure is to provide a resin composition comprising the aforesaid phenylvinylsilane-divinylbenzene-styrene terpolymer and a vinyl group-containing polyphenylene ether resin, such as comprising 30 parts by weight to 50 parts by weight of the phenylvinylsilane-divinylbenzene-styrene terpolymer and 100 parts by weight of a vinyl group-containing polyphenylene ether resin.

Unless otherwise specified, the resin composition of the present disclosure may further optionally comprise a maleimide resin, a maleimide triazine resin, an unsaturated polyolefin resin, a hydrogenated unsaturated polyolefin resin, a small molecule vinyl group-containing resin, a styrene maleic anhydride resin, an epoxy resin, a phenolic resin, a benzoxazine resin, a cyanate ester resin, a polyester resin, a polyamide resin, a polyimide resin or a combination thereof.

For example, in one embodiment, the small molecule vinyl group-containing resin refers to a vinyl group-containing compound with a molecular weight of less than or equal to 1000, preferably between 100 and 900 and more preferably between 100 and 800. For example, the small molecule vinyl group-containing resin comprises, but not limited to, styrene, divinylbenzene, bis(vinylbenzyl) ether, 1,2,4-trivinylcyclohexane (TVCH), bis(vinylphenyl) ethane (BVPE), bis(vinylphenyl)hexane, bis(vinylphenyl) dimethyl ether, bis(vinylphenyl) dimethyl benzene, triallyl isocyanurate (TAIC), and/or triallyl cyanurate (TAC). In one embodiment, the small molecule vinyl group-containing resin comprises a prepolymer of any one of the foregoing components. In one embodiment, the vinyl group-containing resin comprises any one of the foregoing components, a prepolymer of any one of the foregoing components or a combination thereof.

For example, in one embodiment, the vinyl group-containing polyphenylene ether resin used herein refers to a polyphenylene ether compound or mixture having an ethylenic carbon-carbon double bond (C═C) or a functional group derived therefrom. Examples of the ethylenic carbon-carbon double bond (C═C) or the functional group derived therefrom may include, but not limited to, a structure containing a vinyl group, a vinylene group, an allyl group, a vinylbenzyl group, a methacrylate group or the like. Unless otherwise specified, the position of the aforesaid functional group is not particularly limited and may be located at the terminal of a long-chain structure. In other words, the vinyl group-containing polyphenylene ether resin described herein represents a polyphenylene ether resin containing a reactive vinyl group or a functional group derived therefrom, examples including but not limited to a polyphenylene ether resin containing a vinyl group, a vinylene group, an allyl group, a vinylbenzyl group, or a methacrylate group.

For example, in one embodiment, the vinyl group-containing polyphenylene ether resin used herein comprises a vinylbenzyl-terminated polyphenylene ether resin, a methacrylate-terminated polyphenylene ether resin (i.e., methacryl-terminated polyphenylene ether resin), an allyl-terminated polyphenylene ether resin or a combination thereof.

For example, the vinylbenzyl-terminated polyphenylene ether resin and the methacrylate-tenninated polyphenylene ether resin respectively comprise a structure of Formula (III) and a structure of Formula (IV):

Formula (III)

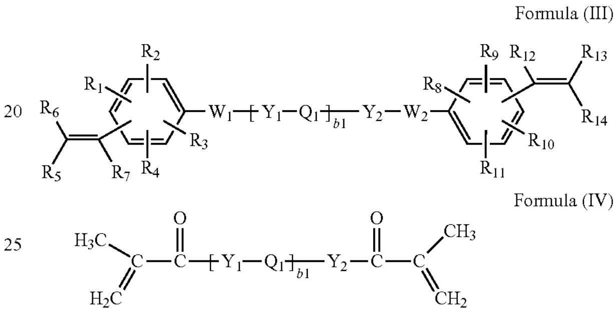

Formula (IV)

wherein $R_1$ to $R_{14}$ are individually H or —$CH_3$, and $W_1$ and $W_2$ are individually a $C_1$ to $C_3$ bivalent aliphatic group;

b1 is an integer of 0 to 8;

$Q_1$ comprises a structure of any one of Formula (B-1) to Formula (B-3) or a combination thereof:

Formula (B-1)

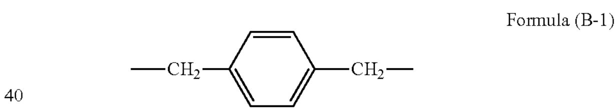

Formula (B-2)

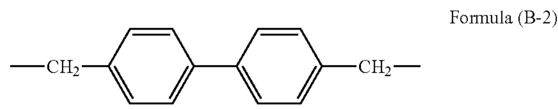

Formula (B-3)

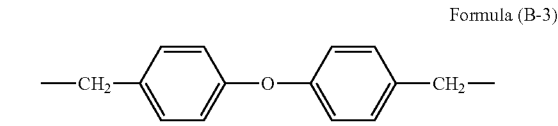

$Y_1$ and $Y_2$ independently comprise a structure of Formula (B-4):

Formula (B-4)

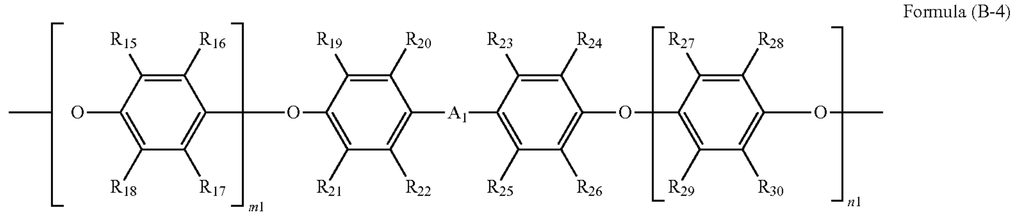

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

For example, the vinyl group-containing polyphenylene ether resin may be SA9000 available from Sabic, a vinylbenzyl group-containing polyphenylene ether resin with a number average molecular weight of about 1200 (such as OPE-2st 1200, available from Mitsubishi Gas Chemical Co., Inc.), a vinylbenzyl group-containing polyphenylene ether resin with a number average molecular weight of about 2200 (such as OPE-2st 2200, available from Mitsubishi Gas Chemical Co., Inc.), a vinylbenzyl group-modified bisphenol A polyphenylene ether resin with a number average molecular weight of about 2400 to 2800, a chain-extended vinyl group-containing polyphenylene ether resin with a number average molecular weight of about 2200 to 3000, or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

For example, in one embodiment, the maleimide resin used herein refers to a compound or a mixture containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, maleimide resin containing aliphatic long-chain structure or a combination thereof. In addition, unless otherwise specified, the aforesaid maleimide resin of the present disclosure may also comprise a prepolymer thereof, such as a prepolymer of diallyl compound and maleimide resin, a prepolymer of diamine and maleimide resin, a prepolymer of multi-functional amine and maleimide resin or a prepolymer of acid phenol compound and maleimide resin, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Industry Co., Ltd., products such as BMI-70 and BMI-80 available from K.I Chemical Industry Co., Ltd, or products such as D928, D930, D932, D934, D936, D937 and D938 available from Sichuan EM Technology Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc. For example, the maleimide resin containing aliphatic long chain structure may have at least one maleimide group bonded with a substituted or unsubstituted long-chain aliphatic group. The long-chain aliphatic group may be a $C_5$ to $C_{50}$ aliphatic group, such as $C_{10}$ to $C_{50}$, $C_{20}$ to $C_{50}$, $C_{30}$ to $C_{50}$, $C_{20}$ to $C_{40}$, or $C_{30}$ to $C_{40}$, but not limited thereto. Examples of commercial maleimide resins containing aliphatic long-chain structure include:

BMI-689

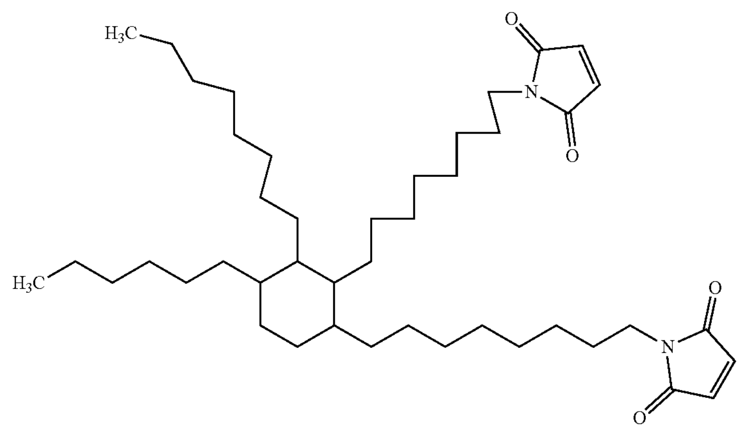

BMI-1400

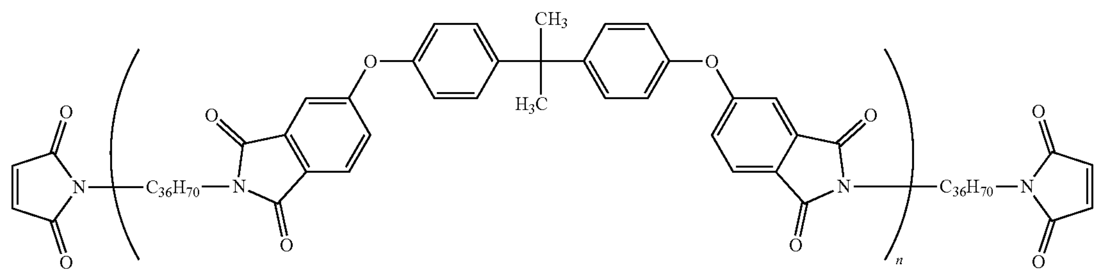

Where n = 1 to 10

-continued
BMI-1500
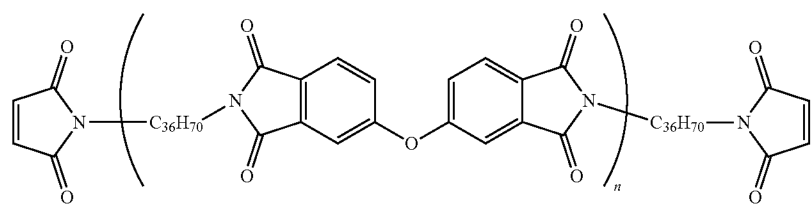
Average n = 1.3
BMI-1700
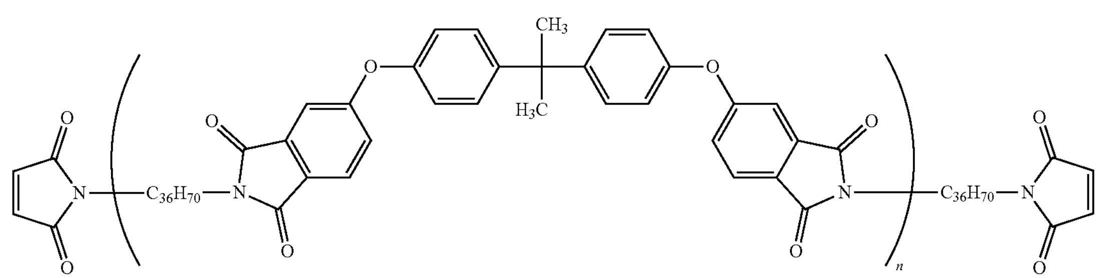
Where n = 1 to 10
BMI-2500
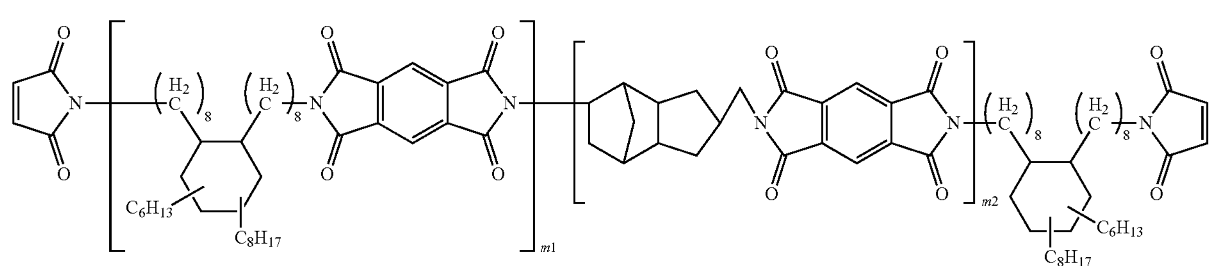
m1 = 3 (average); m2 = 3 (average)
BMI-3000, BMI-5000, BMI-6000
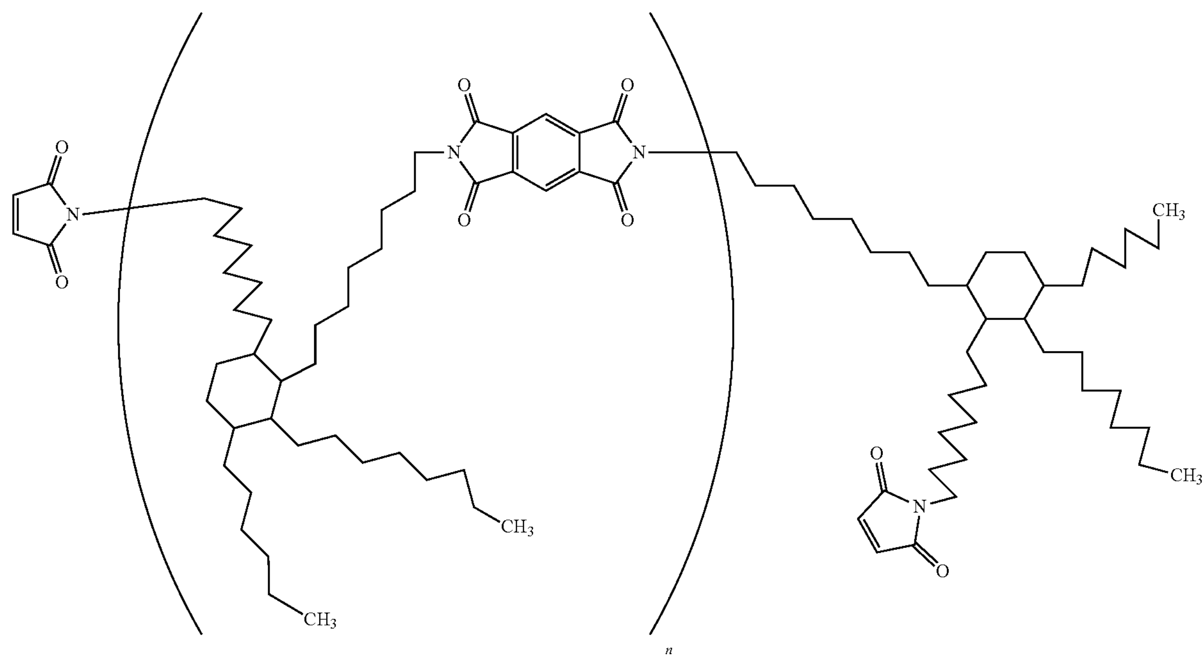
Where n = 1 to 10

For example, in one embodiment, the styrene maleic anhydride resin used herein may have a ratio of styrene (S) to maleic anhydride (MA) of 1:1, 2:1, 3:1, 4:1, 6:1, or 8:1, examples including but not limited to styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 available from Cray Valley. Unless otherwise specified, the styrene maleic anhydride resin can be added individually or as a combination to the resin composition of this disclosure.

For example, in one embodiment, the unsaturated polyolefin resin described herein may include any one or more unsaturated C═C double bond-containing polyolefin resins useful for preparing a prepreg, a resin film, a laminate or a printed circuit board. Examples include but are not limited to styrene-butadiene-divinylbenzene terpolymer, styrene-butadiene-maleic anhydride terpolymer, styrene-butadiene-styrene terpolymer; vinyl-polybutadiene-urethane oligomer, styrene-butadiene copolymer, styrene-isoprene copolymer, polybutadiene, methylstyrene homopolymer, petroleum resin, cycloolefin copolymer and a combination thereof.

For example, in one embodiment, the hydrogenated unsaturated polyolefin resin described herein is obtained by hydrogenating an unsaturated polyolefin resin and may include any one or more unsaturated C═C double bond-free hydrogenated unsaturated polyolefin resins useful for preparing a prepreg, a resin film, a laminate or a printed circuit board. Examples include but are not limited to any one or a combination of hydrogenated styrene-butadiene copolymer and hydrogenated styrene-isoprene copolymer.

For example, in one embodiment, the epoxy resin as used herein may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, in one embodiment, the phenolic resin described herein may be a mono-functional, bifunctional or multi-functional phenolic resin. The type of the phenolic resin is not particularly limited and may include those currently used in the field to which this disclosure pertains. Preferably, the phenolic resin is selected from a phenoxy resin, a novolac resin or a combination thereof.

For example, in one embodiment, the benzoxazine resin described herein may include bisphenol A benzoxazine resin, bisphenol F benzoxazine resin, phenolphthalein benzoxazine resin, dicyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, in one embodiment, the cyanate ester resin described herein may include any known cyanate ester resins used in the art, including but not limited to a cyanate ester resin with an Ar—O—C≡N structure (wherein Ar represents an aromatic group, such as benzene, naphthalene or anthracene), a phenol novolac cyanate ester resin, a bisphenol A cyanate ester resin, a bisphenol A novolac cyanate ester resin, a bisphenol F cyanate ester resin, a bisphenol F novolac cyanate ester resin, a dicyclopentadiene-containing cyanate ester resin, a naphthalene-containing cyanate ester resin, a phenolphthalein cyanate ester resin, or a combination thereof. Examples of the cyanate ester resin include but are not limited to Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy available from Lonza.

For example, in one embodiment, the polyester resin described herein may be obtained by esterification of an aromatic compound with two carboxylic groups and an aromatic compound with two hydroxyl groups, such as but not limited to HPC-8000, HPC-8150 or HPC-8200 available from DIC Corporation.

For example, in one embodiment, the polyamide resin described herein may be any polyamide resins known in the field to which this disclosure pertains, including but not limited to various commercially available polyamide resin products.

For example, in one embodiment, the polyimide resin described herein may be any polyimide resins known in the field to which this disclosure pertains, including but not limited to various commercially available polyimide resin products.

For example, in one embodiment, the maleimide triazine resin described in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. The maleimide triazine resin may be obtained by polymerizing bisphenol A cyanate ester resin and maleimide resin, by polymerizing bisphenol F cyanate ester resin and maleimide resin, by polymerizing phenol novolac cyanate ester resin and maleimide resin or by polymerizing dicyclopentadiene-containing cyanate ester resin and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

Unless otherwise specified, the amount or ratio of the phenylvinylsilane-divinylbenzene-styrene terpolymer and the vinyl group-containing polyphenylene ether resin is not particularly limited.

For example, in one embodiment, the resin composition comprises 100 parts by weight of a vinyl group-containing polyphenylene ether resin and 30 parts by weight to 50 parts by weight of a phenylvinylsilane-divinylbenzene-styrene terpolymer.

In one embodiment, in addition to the phenylvinylsilane-divinylbenzene-styrene terpolymer described above and any one or more vinyl group-containing polyphenylene ether resins, the resin composition disclosed herein may further optionally comprise amine curing agent, flame retardant, inorganic filler, curing accelerator, polymerization inhibitor, coloring agent, solvent, toughening agent, silane coupling agent or a combination thereof.

For example, in one embodiment, the resin composition not only comprises the vinyl group-containing polyphenylene ether resin and the phenylvinylsilane-divinylbenzene-styrene terpolymer described above but also further comprises amine curing agent, flame retardant, inorganic filler, curing accelerator, polymerization inhibitor, coloring agent, solvent, toughening agent, silane coupling agent or a combination thereof.

For example, in one embodiment, the amine curing agent described herein may be dicyandiamide, diamino diphenyl sulfone, diamino diphenyl methane, diamino diphenyl ether, diamino diphenyl sulfide or a combination thereof, but not limited thereto.

For example, in one embodiment, the flame retardant used herein may be any one or more flame retardants useful for preparing a prepreg, a resin film, a laminate or a printed circuit board; examples of the flame retardant include but are not limited to a phosphorus-containing flame retardant, such as any one, two or more selected from the following group: ammonium polyphosphate, hydroquinone bis-(diphenylphosphate), bisphenol A bis-(diphenylphosphate), tri(2-carboxyethyl) phosphine (TCEP), phosphoric acid tris (chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, diphenylphosphine oxide (DPPO) and its derivatives or resins, melamine cyanurate, tri-hydroxy ethyl isocyanurate, aluminium phosphinate (e.g., commercially available OP-930 and OP-935), or a combination thereof.

For example, the flame retardant used herein may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, etc., wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac), etc.

For example, in one embodiment, the inorganic filler used herein may be any one or more inorganic fillers used for preparing a resin film, a prepreg, a laminate or a printed circuit board; examples include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, and calcined kaolin. Moreover, the inorganic filler can be spherical, fibrous, plate-like, particulate, flake-like or whisker-like and can be optionally pretreated by a silane coupling agent.

In one embodiment, for example, the curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butyl peroxy)-3-hexyne (25B), bis(tert-butylperoxyisopropyl)benzene or a combination thereof.

In one embodiment, for example, the polymerization inhibitor used herein is not particularly limited and may be any polymerization inhibitor known in the field to which this disclosure pertains, including but not limited to various commercially available polymerization inhibitor products. For example, the polymerization inhibitor may comprise, but not limited to, 1,1-diphenyl-2-picrylhydrazyl radical, methyl acrylonitrile, dithioester, nitroxide-mediated radical, triphenylmethyl radical, metal ion radical, sulfur radical, hydroquinone, 4-methoxyphenol, p-benzoquinone, phenothiazine, pi-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof.

For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include such as 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethylpyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals.

The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

In one embodiment, for example, the coloring agent suitable for the present disclosure may comprise, but not limited to, dye or pigment.

In one embodiment, for example, the purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

In one embodiment, for example, the purpose of adding toughening agent is to improve the toughness of the resin composition. The toughening agent may comprise, but not limited to, carboxyl-terminated butadiene acrylonitrile rubber (CTBN rubber), core-shell rubber, or a combination thereof.

In one embodiment, for example, the silane coupling agent used herein may comprise silane (such as but not limited to siloxane) and may be further categorized according to the functional groups into amino silane compound, epoxide silane compound, vinylsilane compound, acrylate silane compound, methacrylate silane compound, hydroxylsilane compound, isocyanate silane compound, methacryloxy silane compound and acryloxy silane compound.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg may be for example 100° C. to 200° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 300° C. and preferably between 200° C. and 280° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil.

Preferably, the laminate is a copper-clad laminate (CCL).

In addition, the laminate may be further processed by trace formation processes to make a circuit board, such as a printed circuit board.

Preferably, the resin composition of the present disclosure or the article made therefrom may achieve improvement in one or more of the following properties including glass transition temperature, copper foil peeling strength, dissipation factor, inner resin flow, branch-like pattern or thermal resistance after moisture absorption.

For example, the resin composition according to the present disclosure or the article made therefrom may achieve one, more or all of the following properties:

a glass transition temperature as measured by using dynamic mechanical analysis by reference to IPC-TM-650 2.4.24.4 of greater than or equal to 220° C., such as between 220° C. and 233° C.;

a copper foil peeling strength as measured by reference to IPC-TM-650 2.4.8 of greater than or equal to 3.50 lb/in, such as between 3.50 lb/in and 3.80 lb/in;

a dissipation factor at 10 GHz as measured by reference to JIS C2565 of less than or equal to 0.00350, such as between 0.00315 and 0.00350;

an inner resin flow after lamination of the article of greater than or equal to 15.0 mm, such as between 15.0 mm and 26.0 mm;

a surface of the article (such as a copper-free laminate) absent of branch-like pattern under visual inspection; and no delamination occurs after subjecting the article to a pressure cooking test by reference to IPC-TM-650 2.6.16.1 followed by a thermal resistance test by reference to IPC-TM-650 2.4.23.

Raw materials below are used to prepare the resin compositions of various Examples and Comparative Examples of the present disclosure according to the amount listed in Table 1 to Table 5 and further fabricated to prepare test samples or articles. Compositions and test results of resin compositions of Examples and Comparative Examples are listed below in Table 1 to Table 5 (in part by weight).

Copolymers 1-5: available from Preparation Examples 1-5.

Comparative Copolymers 1-12: available from Comparative Preparation Examples 1-12.

Phenyltrivinylsilane: as shown by Formula (I), available from Suzhou Siso New Material Co., Ltd.

Diphenyldivinylsilane: as shown by Formula (II), available from Suzhou Siso New Material Co., Ltd.

Divinylbenzene: available from Nippon Steel & Sumikin Chemical.

Styrene: commercially available.

Allyltrimethylsilane: commercially available.

Ricon 100: styrene-butadiene copolymer, available from Cray Valley.

Methacrylate: commercially available.

SA9000: methacrylate-terminated polyphenylene ether resin, available from Sabic.

OPE-2st 2200: vinylbenzyl-terminated polyphenylene ether resin, available from Sabic.

ODV1: multifunctional vinyl group-containing aromatic copolymer, having a molecular weight of 28600, comprising ethylvinylbenzene, divinylbenzene and styrene structure units, available from Nippon Steel & Sumikin Chemical.

ODV2: multifunctional vinyl group-containing aromatic copolymer, having a molecular weight of 89000, comprising ethylvinylbenzene, divinylbenzene and styrene structure units, available from Nippon Steel & Sumikin Chemical.

SC-2500SMJ: spherical silica pre-treated by acrylate silane coupling agent, available from Admatechs.

25B: 2,5-dimethyl-2,5-di(t-butylperoxy)-3-hexyne, available from NOF Corporation.

MEK: methyl ethyl ketone, commercially available.

Toluene: available from Chambeco Group.

In the Tables, "Z" represents the total amount of components excluding (i.e., not containing) inorganic filler and solvent in the resin composition of each Example or each Comparative Example. For example. "Z*1.0" represents the amount of inorganic filler is 1.0 time of "Z". For example, in Example E1, "Z*0.6" represents that the amount of inorganic filler is 90.3 parts by weight (150.5 parts by weight multiplied by 0.6).

The amount of solvent is shown as "PA" in the Tables to indicate a "proper amount" to represent an amount of solvents used to achieve a desirable solid content of the whole resin composition. For a resin composition comprises methyl ethyl ketone and toluene as solvents, "PA" represents the total amount of the two solvents used to achieve a desirable solid content of the whole resin composition, such as but not limited to a solid content of 70 wt %.

Compositions and test results of resin compositions of Examples and Comparative Examples are listed below in Table 1 to Table 5 (in part by weight):

TABLE 1

Resin compositions of Examples (in part by weight) and test results

| Component | | E1 | E2 | E3 | E4 | E5 | E6 |
|---|---|---|---|---|---|---|---|
| copolymer | Copolymer 1 | 50 | | | | | |
| | Copolymer 2 | | 50 | | | 40 | 30 |
| | Copolymer 3 | | | 50 | | | |
| | Copolymer 4 | | | | 50 | | |
| | Copolymer 5 | | | | | | |
| vinyl group-containing polyphenylene ether resin | SA9000 | 100 | 100 | 100 | 100 | 100 | 100 |
| | OPE-2st 2200 | | | | | | |
| inorganic filler | SC-2500SMJ | Z*0.6 | Z*0.6 | Z*0.6 | Z*0.6 | Z*0.6 | Z*0.6 |
| curing accelerator | 25B | 0.5 | 0.5 | 0.5 | 0.5 | 0.5 | 0.5 |
| solvent | MEK | PA | PA | PA | PA | PA | PA |
| | toluene | PA | PA | PA | PA | PA | PA |

| Property | Unit | E1 | E2 | E3 | E4 | E5 | E6 |
|---|---|---|---|---|---|---|---|
| glass transition temperature | ° C. | 232 | 229 | 230 | 230 | 224 | 220 |
| copper foil peeling strength | lb/in | 3.70 | 3.70 | 3.75 | 3.50 | 3.65 | 3.70 |
| dissipation factor | / | 0.00330 | 0.00330 | 0.00330 | 0.00320 | 0.00340 | 0.00350 |
| inner resin flow | mm | 20.0 | 22.0 | 20.5 | 24.0 | 18.0 | 16.0 |
| branch-like pattern | visual inspection | none | none | none | none | none | none |
| thermal resistance after moisture absorption | visual inspection | pass | pass | pass | pass | pass | pass |

TABLE 2

Resin compositions of Examples (in part by weight) and test results

| Component | | E7 | E8 | E9 | E10 | E11 | E12 |
|---|---|---|---|---|---|---|---|
| copolymer | Copolymer 1 | | | | | | |
| | Copolymer 2 | | 50 | 50 | 50 | 50 | 50 |
| | Copolymer 3 | | | | | | |
| | Copolymer 4 | | | | | | |
| | Copolymer 5 | 50 | | | | | |
| vinyl group-containing polyphenylene ether resin | SA9000 | 100 | | 100 | 100 | 100 | 100 |
| | OPE-2st 2200 | | 100 | | | | |
| inorganic filler | SC-2500SMJ | Z*0.6 | Z*0.6 | Z*0.2 | Z*1.3 | Z*0.6 | Z*0.6 |
| curing accelerator | 25B | 0.5 | 0.5 | 0.5 | 0.5 | 0.25 | 1.0 |
| solvent | MEK | PA | PA | PA | PA | PA | PA |
| | toluene | PA | PA | PA | PA | PA | PA |

TABLE 2-continued

| Resin compositions of Examples (in part by weight) and test results | | | | | | | |
|---|---|---|---|---|---|---|---|
| Property | Unit | E7 | E8 | E9 | E10 | E11 | E12 |
| glass transition temperature | ° C. | 220 | 231 | 227 | 230 | 221 | 233 |
| copper foil peeling strength | lb/in | 3.75 | 3.80 | 3.80 | 3.50 | 3.60 | 3.75 |
| dissipation factor | / | 0.00320 | 0.00340 | 0.00330 | 0.00325 | 0.00315 | 0.00350 |
| inner resin flow | mm | 23.0 | 17.0 | 25.0 | 15.0 | 26.0 | 15.5 |
| branch-like pattern | visual inspection | none | none | none | none | none | none |
| thermal resistance after moisture absorption | visual inspection | pass | pass | pass | pass | pass | pass |

TABLE 3

| Resin compositions of Comparative Examples (in part by weight) and test results | | | | | | | | |
|---|---|---|---|---|---|---|---|---|
| Component | | C1 | C2 | C3 | C4 | C5 | C6 | C7 |
| copolymer | Copolymer 2 | 20 | 60 | | | | | |
| | Comparative Copolymer 1 | | | 50 | | | | |
| | Comparative Copolymer 2 | | | | 50 | | | |
| | Comparative Copolymer 3 | | | | | 50 | | |
| | Comparative Copolymer 4 | | | | | | 50 | |
| | Comparative Copolymer 5 | | | | | | | 50 |
| | Comparative Copolymer 6 | | | | | | | |
| | Comparative Copolymer 7 | | | | | | | |
| | Comparative Copolymer 8 | | | | | | | |
| | Comparative Copolymer 9 | | | | | | | |
| | Comparative Copolymer 10 | | | | | | | |
| | Comparative Copolymer 11 | | | | | | | |
| | Comparative Copolymer 12 | | | | | | | |
| | ODV1 | | | | | | | |
| | ODV2 | | | | | | | |
| phenyltrivinylsilane | | | | | | | | |
| divinylbenzene | | | | | | | | |
| styrene | | | | | | | | |
| vinyl group-containing polyphenylene ether resin | SA9000 | 100 | 100 | 100 | 100 | 100 | 100 | 100 |
| inorganic filler | SC-2500SMJ | Z*0.6 | Z*0.6 | Z*0.6 | Z*0.6 | Z*0.6 | Z*0.6 | Z*0.6 |
| curing accelerator | 25B | 0.5 | 0.5 | 0.5 | 0.5 | 0.5 | 0.5 | 0.5 |
| solvent | MEK | PA | PA | PA | PA | PA | PA | PA |
| | toluene | PA | PA | PA | PA | PA | PA | PA |
| Property | Unit | C1 | C2 | C3 | C4 | C5 | C6 | C7 |
| glass transition temperature | ° C. | 225 | 231 | 205 | 225 | 197 | 233 | 220 |
| copper foil peeling strength | lb/in | 4.30 | 3.10 | 3.70 | 3.10 | 3.70 | 3.60 | 3.70 |
| dissipation factor | / | 0.00400 | 0.00320 | 0.00340 | 0.00330 | 0.00350 | 0.00320 | 0.00320 |
| inner resin flow | mm | 12.0 | 23.0 | 5.0 | 18.0 | 7.0 | 1.0 | 2.0 |
| branch-like pattern | visual inspection | none | serious | none | none | none | none | none |
| thermal resistance after moisture absorption | visual inspection | pass | fail | pass | pass | pass | fail | fail |

TABLE 4

Resin compositions of Comparative Examples (in part by weight) and test results

| Component | | C8 | C9 | C10 | C11 | C12 | C13 | C14 |
|---|---|---|---|---|---|---|---|---|
| copolymer | Copolymer 2 | | | | | | | |
| | Comparative Copolymer 1 | | | | | | | |
| | Comparative Copolymer 2 | | | | | | | |
| | Comparative Copolymer 3 | | | | | | | |
| | Comparative Copolymer 4 | | | | | | | |
| | Comparative Copolymer 5 | | | | | | | |
| | Comparative Copolymer 6 | 50 | | | | | | |
| | Comparative Copolymer 7 | | 50 | | | | | |
| | Comparative Copolymer 8 | | | 50 | | | | |
| | Comparative Copolymer 9 | | | | 50 | | | |
| | Comparative Copolymer 10 | | | | | 50 | | |
| | Comparative Copolymer 11 | | | | | | | |
| | Comparative Copolymer 12 | | | | | | 50 | |
| | ODV1 | | | | | | | 50 |
| | ODV2 | | | | | | | |
| phenyltrivinylsilane | | | | | | | | |
| divinylbenzene | | | | | | | | |
| styrene | | | | | | | | |
| vinyl group-containing polyphenylene ether resin | SA9000 | 100 | 100 | 100 | 100 | 100 | 100 | 100 |
| inorganic filler | SC-2500SMJ | Z*0.6 | Z*0.6 | Z*0.6 | Z*0.6 | Z*0.6 | Z*0.6 | Z*0.6 |
| curing accelerator | 25B | 0.5 | 0.5 | 0.5 | 0.5 | 0.5 | 0.5 | 0.5 |
| solvent | MEK | PA | PA | PA | PA | PA | PA | PA |
| | toluene | PA | PA | PA | PA | PA | PA | PA |

| Property | Unit | C8 | C9 | C10 | C11 | C12 | C13 | C14 |
|---|---|---|---|---|---|---|---|---|
| glass transition temperature | ° C. | 195 | 190 | 178 | 180 | 188 | 195 | 190 |
| copper foil peeling strength | lb/in | 3.20 | 3.10 | 2.90 | 3.10 | 3.30 | 3.50 | 2.60 |
| dissipation factor | / | 0.00330 | 0.00330 | 0.00350 | 0.00310 | 0.00380 | 0.00450 | 0.00320 |
| inner resin flow | mm | 14.0 | 16.0 | 7.0 | 7.0 | 3.0 | 9.0 | 0.3 |
| branch-like pattern | visual inspection | none | none | none | serious | none | none | none |
| thermal resistance after moisture absorption | visual inspection | fail | fail | fail | fail | fail | fail | fail |

TABLE 5

Resin compositions of Comparative Examples (in part by weight) and test results

| Component | | C15 | C16 | C17 | C18 | C19 | C20 | C21 |
|---|---|---|---|---|---|---|---|---|
| copolymer | Copolymer 2 | | | | | | | |
| | Comparative Copolymer 1 | | | | | | | |
| | Comparative Copolymer 2 | | | | | | | |
| | Comparative Copolymer 3 | | | | | | | |
| | Comparative Copolymer 4 | | | | | | | |
| | Comparative Copolymer 5 | | | | | | | |
| | Comparative Copolymer 6 | | | | | | | |
| | Comparative Copolymer 7 | | | | | | | |

TABLE 5-continued

| Resin compositions of Comparative Examples (in part by weight) and test results | | | | | | | | |
|---|---|---|---|---|---|---|---|---|
| | Comparative Copolymer 8 | | | | | | | |
| | Comparative Copolymer 9 | | | | | | | |
| | Comparative Copolymer 10 | | | | | | | |
| | Comparative Copolymer 11 | | | | | | 20 | |
| | Comparative Copolymer 12 | | | | | | | |
| | ODV1 | | | | | 20 | | |
| | ODV2 | 50 | | | | | | |
| | phenyltrivinylsilane | | 50 | | | 30 | 30 | 30 |
| | divinylbenzene | | | 50 | | | | 5 |
| | styrene | | | | 50 | | | 15 |
| vinyl group-containing polyphenylene ether resin | SA9000 | 100 | 100 | 100 | 100 | 100 | 100 | 100 |
| inorganic filler | SC-2500SMJ | Z*0.6 | Z*0.6 | Z*0.6 | Z*0.6 | Z*0.6 | Z*0.6 | Z*0.6 |
| curing accelerator | 25B | 0.5 | 0.5 | 0.5 | 0.5 | 0.5 | 0.5 | 0.5 |
| solvent | MEK | PA | PA | PA | PA | PA | PA | PA |
| | toluene | PA | PA | PA | PA | PA | PA | PA |
| **Property** | **Unit** | **C15** | **C16** | **C17** | **C18** | **C19** | **C20** | **C21** |
| glass transition temperature | ° C. | 192 | 200 | 205 | 178 | 198 | 205 | 192 |
| copper foil peeling strength | lb/in | 2.90 | 3.00 | 3.00 | 3.20 | 2.95 | 3.20 | 3.00 |
| dissipation factor | / | 0.00350 | 0.00350 | 0.00350 | 0.00450 | 0.00355 | 0.00350 | 0.00430 |
| inner resin flow | mm | 2.0 | 15.0 | 2.0 | 3.0 | 6.0 | 8.0 | 7.0 |
| branch-like pattern | visual inspection | none | none | serious | serious | none | none | serious |
| thermal resistance after moisture absorption | visual inspection | fail | pass | fail | fail | pass | fail | fail |

Resin compositions from Table 1 to Table 5 were used to make varnishes and various samples (specimens) as described below and tested under conditions specified below so as to obtain the test results.

Varnish

Components of the resin composition from each Example (abbreviated as E, such as E1 to E12) or Comparative Example (abbreviated as C, such as C1 to C21) were added to a stirrer according to the amounts listed in Tables 1-5 for stirring and well-mixing to form a resin varnmish.

For example, in Example E1, 100 parts by weight of a vinyl group-containing polyphenylene ether resin (SA9000) and 50 parts by weight of Copolymer 1 were added to a stirrer containing a proper amount of toluene and a proper amount of methyl ethyl ketone (i.e., a proper amount (abbreviated as "PA") in Table 1 to Table 5 represents an amount of solvent suitable for obtaining a desired solid content for the resin composition, such as a solid content of the varnish being 70 wt %), and the solution was mixed and stirred to fully dissolve the solid ingredients to form a homogeneous liquid state. Then "Z*0.6" parts by weight of spherical silica SC-2500SMJ (i.e., 90.3 parts by weight) were added and well dispersed, followed by adding 0.5 part by weight of a curing accelerator (25B, pre-dissolved by a proper amount of solvent) and stirring for 1 hour to obtain the varnish of resin composition E1.

In addition, according to the components and amounts listed in Table 1 to Table 5 above, varnishes of Examples E2 to E12 and Comparative Examples C1 to C21 were prepared following the preparation process of the varnish of Example E1.

Prepreg (Using 2116 E-Glass Fiber Fabric)

Resin compositions from different Examples (E1 to E12) and Comparative Examples (C1 to C21) listed in Table 1 to Table 5 were respectively added to a stirred tank, well mixed and fully dissolved as varnishes and then added to an impregnation tank. A fiberglass fabric (e.g., 2116 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 52%).

Prepreg (Using 1080 E-Glass Fiber Fabric)

Resin compositions from different Examples (E1 to E12) and Comparative Examples (C1 to C21) listed in Table 1 to Table 5 were respectively added to a stirred tank, well mixed and fully dissolved as varnishes and then added to an impregnation tank. A fiberglass fabric (e.g., 1080 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 71%).

Copper-Clad Laminate (Obtained by Laminating Five Prepregs)

Two 18 μm hyper very low profile copper foils (HVLP copper foils) and five prepregs made from each resin composition (using 1080 E-glass fiber fabric) were prepared batchwise. Each prepreg has a resin content of about 71%. A copper foil, five prepregs and a copper foil were superimposed in such order and then subjected to a vacuum condition for lamination at 210° C. for 2 hours to form each copper-clad laminate sample. Insulation layers were formed by curing (C-stage) five sheets of superimposed prepreg between the two copper foils, and the resin content of the insulation layers was about 71%.

Copper-Clad Laminate (Obtained by Laminating Eight Prepregs)

Two 18 μm hyper very low profile copper foils (HVLP copper foils) and eight prepregs made from each resin composition (using 2116 E-glass fiber fabric) were prepared batchwise. Each prepreg has a resin content of about 52%. A copper foil, eight prepregs and a copper foil were superimposed in such order and then subjected to a vacuum condition for lamination at 210° C. for 2 hours to form each copper-clad laminate sample. Insulation layers were formed by curing (C-stage) eight sheets of superimposed prepreg between the two copper foils, and the resin content of the insulation layers was about 52%.

Copper-Free Laminate (Obtained by Laminating Eight Prepregs)

Each copper-clad laminate obtained by laminating eight prepregs was etched to remove the two copper foils to obtain a copper-free laminate made from laminating eight prepregs and having a resin content of about 52%.

Copper-Free Laminate (Obtained by Laminating Two Prepregs)

Two 18 μm hyper very low profile 2 copper foils (HVLP2 copper foils) and two prepregs made from each resin composition (using 1080 E-glass fiber fabric) were prepared batchwise. Each prepreg has a resin content of about 71%. A copper foil, two prepregs and a copper foil were superimposed in such order and then subjected to a vacuum condition for lamination at 210° C. for 2 hours to form each copper-clad laminate, which was then subjected to an etching process to remove the copper foils on both sides to obtain a copper-free laminate sample. Insulation layers were formed by curing (C-stage) two sheets of superimposed prepreg between the two copper foils, and the resin content of the insulation layers was about 71%.

Test items and test methods are described below.

1. Glass Transition Temperature (Tg)

A copper-free laminate (obtained by laminating eight prepregs) sample was subjected to glass transition temperature measurement by using the dynamic mechanical analysis (DMA) method. Each sample was heated from 35° C. to 380° C. at a heating rate of 2° C./minute and then subjected to the measurement of glass transition temperature (° C.) by reference to the method described in IPC-TM-650 2.4.24.4. Higher glass transition temperature represents a better property of the sample.

For example, articles made from the resin composition disclosed herein are characterized by having a high glass transition temperature as measured by reference to IPC-TM-650 2.4.24.4, such as a glass transition temperature (Tg) of greater than or equal to 220° C., such as between 220° C. and 233° C., such as 220° C., 221° C., 224° C., 227° C., 229° C., 230° C., 231° C., 232° C. or 233° C.

2. Copper Foil Peeling Strength (Peel Strength, P/S)

A copper-clad laminate (obtained by laminating eight prepregs) was cut into a rectangular specimen with a width of 24 mm and a length of greater than 60 mm, which was then etched to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil from the laminate surface. A higher copper foil peeling strength is more preferred, and a difference in copper foil peeling strength of greater than or equal to 0.1 lb/in represents a significant difference (i.e., significant technical difficulty).

For example, articles made from the resin composition disclosed herein are characterized by having a copper foil peeling strength as measured by reference to IPC-TM-650 2.4.8 of greater than or equal to 3.50 lb/in, preferably greater than or equal to 3.50 lb/in, 3.60 lb/in, 3.65 lb/in, 3.70 lb/in, 3.75 lb/in, or 3.80 lb/in, such as between 3.50 lb/in and 3.80 lb/in.

3. Dissipation Factor (Df)

In the measurement of dissipation factor, a copper-free laminate sample (obtained by laminating two prepregs) was tested by using a microwave dielectrometer available from AET Corp. by reference to JIS C2565 at 10 GHz for analyzing each sample. Lower dissipation factor represents better dielectric properties of the sample.

Under a 10 GHz frequency, for a Df value of less than or equal to 0.005, a difference in Df of less than 0.0001 represents no substantial difference in dissipation factor in different laminates, and a difference in Df of greater than or equal to 0.0001 represents a substantial difference (i.e., significant technical difficulty) in dissipation factor in different laminates.

For example, articles made from the resin composition disclosed herein are characterized by having a dissipation factor measured by reference to JIS C2565 at 10 GHz of less than or equal to 0.00350, such as between 0.00315 and 0.00350, such as less than or equal to 0.00315, 0.00320, 0.00325, 0.00330, 0.00340 or 0.00350.

4. Inner Resin Flow

First, an EM-827 copper-containing laminate was used as a copper-containing core (available from Elite Electronic Material (Zhongshan) Co., Ltd., using 7628 E-glass fiber fabric and 1-ounce HTE copper foil), which had a thickness of 28 mil. Then the surface copper foil of the copper-containing core was subjected to a conventional brown oxidation process to obtain a brown oxide treated core.

A prepreg (using 1080 E-glass fiber fabric, resin content of about 71%, about 4.5 mil in thickness, 17 inch*15 inch in size) prepared from each Example (E1 to E12) and each Comparative Example (C1 to C21) and a brown oxide treated core (28 mil in thickness, 18 inch*16 inch in size) were prepared, wherein the center of the prepreg was a 4 inch*4 inch rhombus opening formed by using a conventional punching machine.

A piece of 0.5-ounce HTE copper foil (in reverse position, i.e., in contact with the prepreg with its smooth surface), a prepreg and a brown oxide treated core were superimposed in such order, followed by lamination and curing for 2 hours in vacuum at high temperature (200° C.) and high pressure (360 psi) to obtain a copper-containing multi-layer board. The surface copper foil of the copper-containing multi-layer board was removed to obtain a sample for inner resin flow test. Each side of the 4 inch*4 inch rhombus shape of the sample for inner resin flow test was divided into four equal sections by three points, and the resin flow (i.e., vertical distance of resin flow) of each of the twelve points was measured to calculate the average of resin flow at the twelve points, so as to obtain the inner resin flow (as an average, in mm) of the sample. Generally, the inner resin flow is preferably between 15.0 mm and 26.0 mm. For example, articles made from the resin composition disclosed herein after lamination are characterized by having an inner resin flow of greater than or equal to 15.0 mm.

5. Branch-Like Pattern

Figure 3:
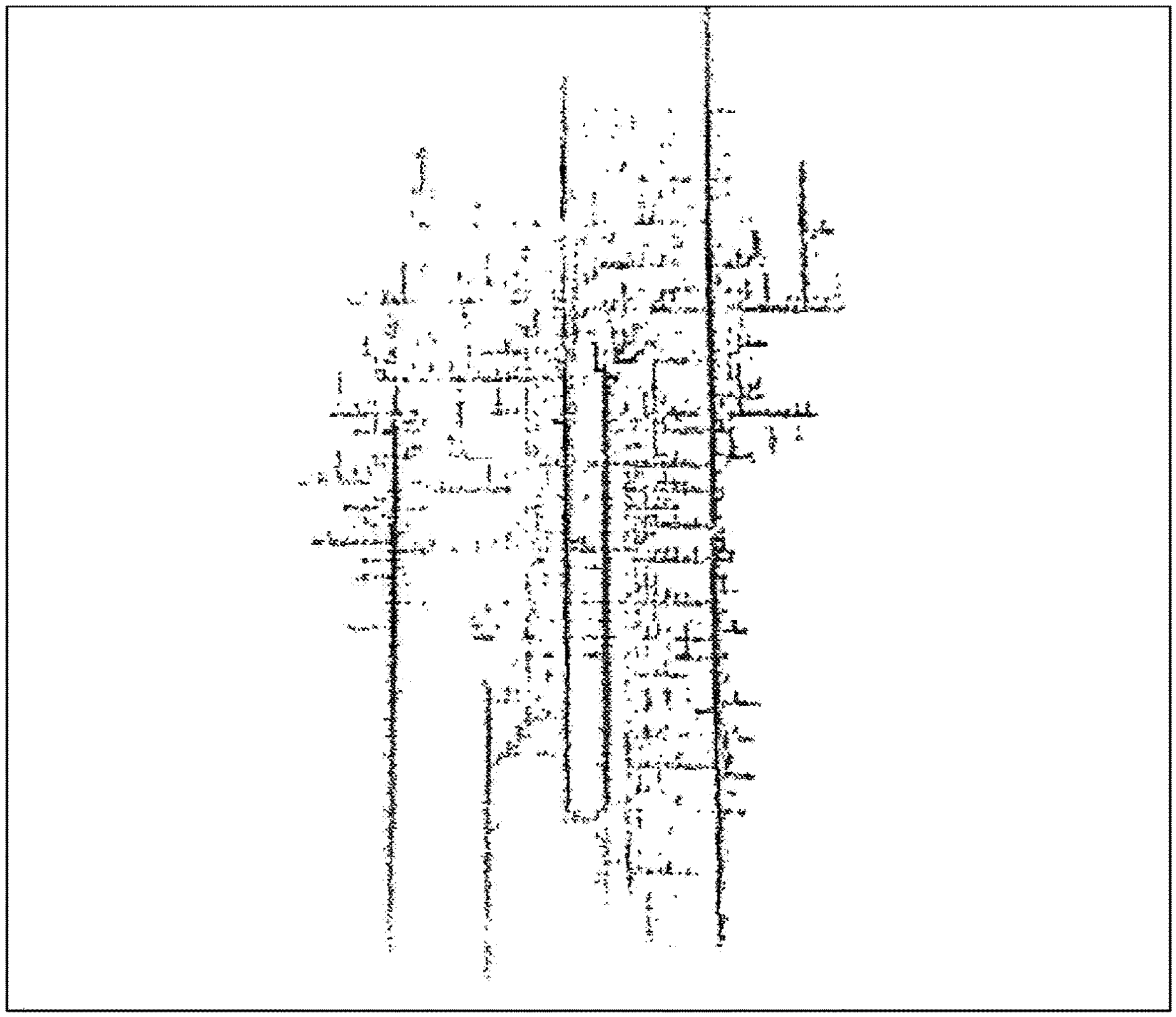
FIG. 3 illustrates a copper-free laminate having branch-like pattern.
Figure 4:
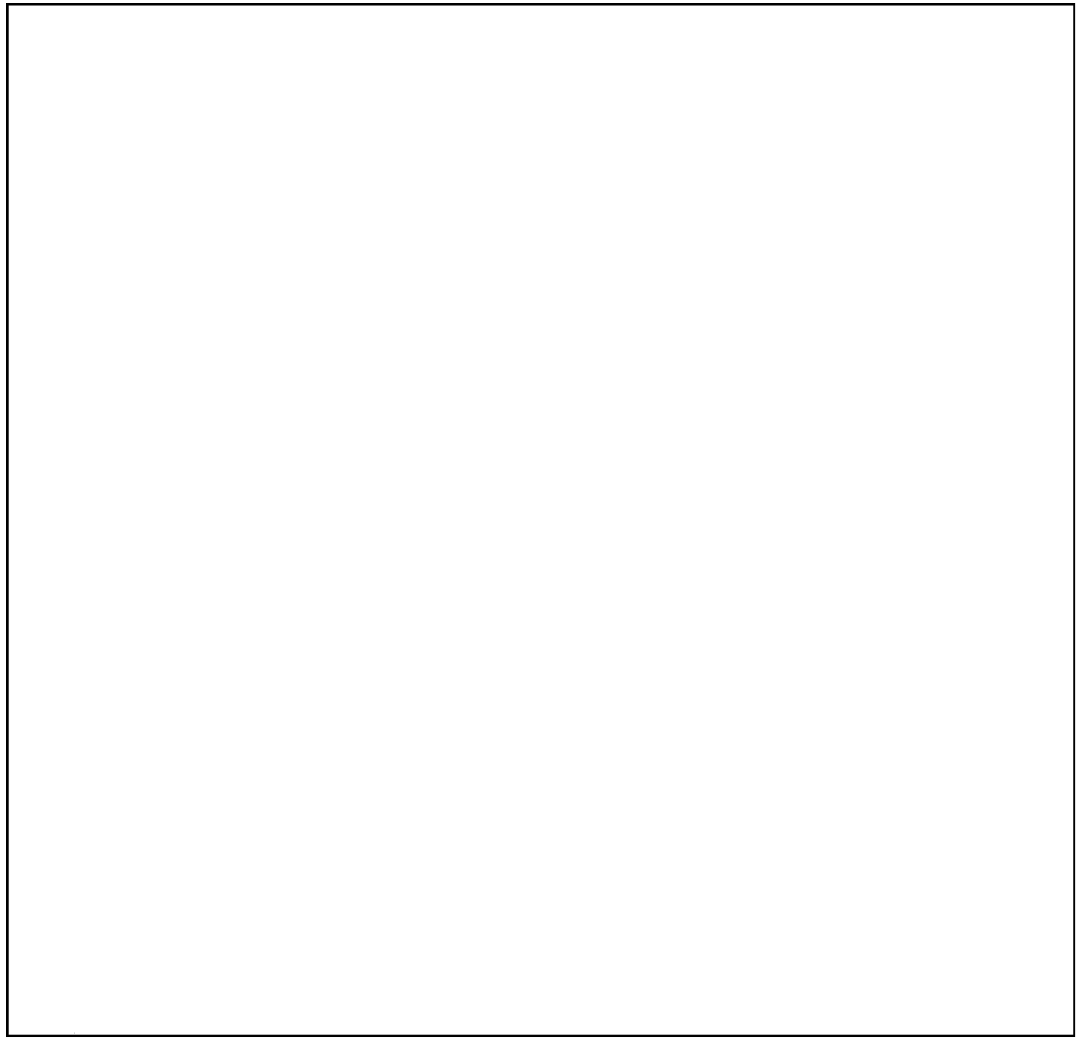
FIG. 4 illustrates a copper-free laminate not having branch-like pattern.

The copper foils on both sides of a copper-clad laminate (obtained by laminating five prepregs) were removed to obtain a copper-free laminate. The surface of the insulation layer of the copper-free laminate was examined with naked eyes to determine whether branch-like pattern was formed at the edge, which represents poor compatibility of the resin composition or high flowability variation that causes inhomogeneity. Presence of branch-like pattern in the laminate will cause several drawbacks including inconsistent properties (poor reliability) of printed circuit boards made therefrom and significantly lowered yield, such as poor dielectric properties, poor thermal resistance, inconsistent thermal expansion or poor interlayer adhesion. FIG. 3 illustrates a copper-free laminate having branch-like pattern, and FIG. 4 illustrates a copper-free laminate not having branch-like pattern.

6. Thermal Resistance after Moisture Absorption (PCT)

A copper-free laminate sample (obtained by laminating eight prepregs) was subjected to pressure cooking test (PCT) by reference to IPC-TM-650 2.6.16.1 and five hours of moisture absorption (testing temperature of 121° C., relative humidity of 100%), and then by reference to IPC-TM-650 2.4.23, the sample after moisture absorption was immersed into a 288° C. solder bath for 20 seconds, removed and then inspected to determine the absence or presence of delamination, such as whether interlayer delamination or blistering occurs between insulation layers. Interlayer delamination or blistering may occur between any layers of the laminate.

For example, articles made from the resin composition disclosed herein are characterized by no delamination occurring in a thermal resistance test after moisture absorption by reference to IPC-TM-650 2.6.16.1 and IPC-TM-650 2.4.23. Absence of delamination is designated as "pass", and occurrence of delamination is designated as "fail".

The following observations can be made from Table 1 to Table 5.

From a side-by-side comparison of Examples $E_1$-E12 with Comparative Examples C1-C2, it can be confirmed that by using 100 parts by weight of a vinyl group-containing polyphenylene ether resin and 30 to 50 parts by weight of a phenylvinylsilane-divinylbenzene-styrene terpolymer, in contrast to using a phenylvinylsilane-divinylbenzene-styrene terpolymer in an amount not within the above range, the article made from the present disclosure can achieve at the same time one, more or all of the following technical effects including higher copper foil peeling strength, lower dissipation factor, proper inner resin flow, absent of branch-like pattern and passing the thermal resistance test after moisture absorption.

From a side-by-side comparison of Examples E1-E4 and E7-E8 with Comparative Examples C3-C9, it can be confirmed that by using a copolymer obtained by reacting 50 parts by weight to 70 parts by weight of phenylvinylsilane, 10 parts by weight to 20 parts by weight of divinylbenzene and 20 parts by weight to 30 parts by weight of styrene, in contrast to the comparative copolymer obtained by copolymerization of components in an amount not within the above range or by copolymerization of phenylvinylsilane with divinylbenzene or styrene separately, the article made from the present disclosure can achieve at the same time one, more or all of the following technical effects including higher glass transition temperature, higher copper foil peeling strength, higher inner resin flow and passing the thermal resistance test after moisture absorption.

From a side-by-side comparison of Examples E1-E4 and E7-E8 with Comparative Examples C10-C13, it can be confirmed that by using a copolymer obtained by reacting 50 parts by weight to 70 parts by weight of phenylvinylsilane, 10 parts by weight to 20 parts by weight of divinylbenzene and 20 parts by weight to 30 parts by weight of styrene, in contrast to the comparative copolymer obtained by using a different monomer or in an amount not within the above range, the article made from the present disclosure can achieve at the same time one, more or all of the following technical effects including higher glass transition temperature, higher copper foil peeling strength, lower dissipation factor, higher inner resin flow, absent of branch-like pattern and passing the thermal resistance test after moisture absorption.

From a side-by-side comparison of Examples E1-E4 and E7-E8 with Comparative Examples C14-C15, it can be confirmed that by using the phenylvinylsilane-divinylbenzene-styrene terpolymer of the present disclosure, in contrast to a multifunctional vinyl group-containing aromatic copolymer, not only the phenylvinylsilane-divinylbenzene-styrene terpolymer made from the present disclosure has a lower reactivity than the multifunctional vinyl group-containing aromatic copolymer so that it provides subsequent process with longer operating time, but also the article made therefrom can achieve at the same time one, more or all of the following technical effects including higher glass transition temperature, higher copper foil peeling strength, higher inner resin flow and passing the thermal resistance test after moisture absorption.

From a side-by-side comparison of Examples E1-E4 and E7-E8 with Comparative Examples C16-C21, it can be confirmed that in the resin composition, by adding 50 parts by weight of a phenylvinylsilane-divinylbenzene-styrene terpolymer, in contrast to adding individually 50 parts by weight of phenyltrivinylsilane, 50 parts by weight of divinylbenzene, 50 parts by weight of styrene, a combination of phenyltrivinylsilane and a multifunctional vinyl group-containing aromatic copolymer, a combination of phenyltrivinylsilane and divinylbenzene-styrene copolymer, or 30 parts by weight of phenyltrivinylsilane, 5 parts by weight of divinylbenzene and 15 parts by weight of styrene without copolymerization, the copolymer made from the present disclosure can achieve at the same time one, more or all of the following technical effects including higher glass transition temperature, higher copper foil peeling strength, lower dissipation factor, higher inner resin flow, absent of branch-like pattern or passing the thermal resistance test after moisture absorption.

From the comparison of Examples E1-E12 and Comparative Examples C1-C21, it can be confirmed that by using 100 parts by weight of a vinyl group-containing polyphenylene ether resin with 30 parts by weight to 50 parts by weight of a phenylvinylsilane-divinylbenzene-styrene terpolymer, the laminate made therefrom can achieve at the same time one, more or all of the following technical effects including a glass transition temperature of greater than or equal to 220° C., a copper foil peeling strength of greater than or equal to 3.50 lb/in, a dissipation factor of less than or equal to 0.00350, and an inner resin flow of greater than or equal to 15.0 mm. In contrast, Comparative Examples C1-C21 not using the technical solution of the present disclosure fail to achieve the aforesaid technical effects at the same time.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as more preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and all foreseeable equivalents at the time of filing this patent application.

What is claimed is:

1. A phenylvinylsilane-divinylbenzene-styrene terpolymer prepared by copolymerizing 50 parts by weight to 70 parts by weight of phenylvinylsilane, 10 parts by weight to 20 parts by weight of divinylbenzene and 20 parts by weight to 30 parts by weight of styrene, the total amount of phenylvinylsilane, divinylbenzene and styrene being 100 parts by weight, wherein the phenylvinylsilane has a structure of Formula (I) or Formula (II):

Formula (I)

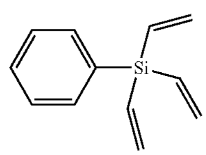

Formula (II)

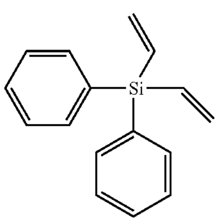

2. The phenylvinylsilane-divinylbenzene-styrene terpolymer of claim 1, having a volatilization percentage of between 40% and 60%.

3. The phenylvinylsilane-divinylbenzene-styrene terpolymer of claim 1, wherein the content of phenylvinylsilane structure unit is 30 mol % to 50 mol %.

4. The phenylvinylsilane-divinylbenzene-styrene terpolymer of claim 1, comprising a structure unit of Formula (a) and a structure unit of Formula (b) and further comprising any one or more of structure units of Formula (c), Formula (d), Formula (e) and Formula (f):

Formula (a)

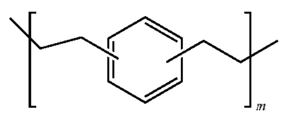

Formula (b)

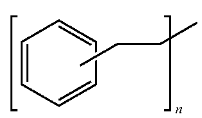

-continued

Formula (c)

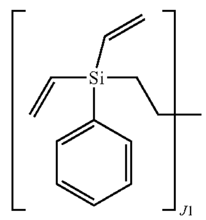

Formula (d)

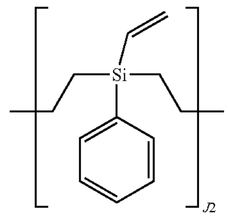

Formula (e)

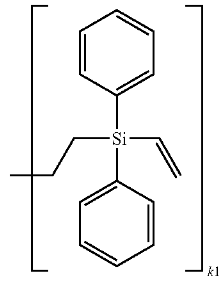

Formula (f)

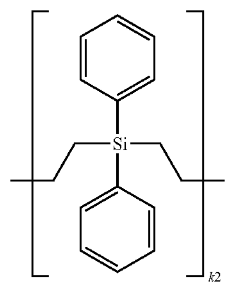

wherein m is an integer of 2 to 45, n is an integer of 5 to 86, J1 and J2 are independently an integer of 3 to 81, and k1 and k2 are independently an integer of 3 to 65.

5. The phenylvinylsilane-divinylbenzene-styrene terpolymer of claim 1, having a weight average molecular weight of between 3000 and 30000.

6. A method of making the phenylvinylsilane-divinylbenzene-styrene terpolymer of claim 1, comprising reacting 50 parts by weight to 70 parts by weight of phenylvinylsilane, 10 parts by weight to 20 parts by weight of divinylbenzene and 20 parts by weight to 30 parts by weight of styrene at 70° C. to 130° C. for 3 hours to 14 hours.

7. A resin composition comprising 30 parts by weight to 50 parts by weight of the phenylvinylsilane-divinylbenzene-styrene terpolymer of claim 1 and 100 parts by weight of a vinyl group-containing polyphenylene ether resin.

8. The resin composition of claim 7, further comprising a maleimide resin, a maleimide triazine resin, an unsaturated polyolefin resin, a hydrogenated unsaturated polyolefin resin, a small molecule vinyl group-containing resin, a styrene maleic anhydride resin, an epoxy resin, a phenolic resin, a benzoxazine resin, a cyanate ester resin, a polyester resin, a polyamide resin, a polyimide resin or a combination thereof.

9. The resin composition of claim 8, wherein the small molecule vinyl group-containing resin comprises styrene, divinylbenzene, bis(vinylbenzyl)ether, 1,2,4-trivinyl cyclohexane, bis(vinylphenyl)ethane, bis(vinylphenyl)hexane, bis(vinylphenyl) dimethyl ether, bis(vinylphenyl) dimethyl benzene, triallyl isocyanurate, triallyl cyanurate, a prepolymer of any one of the foregoing components or a combination thereof.

10. The resin composition of claim 7, wherein the vinyl group-containing polyphenylene ether resin comprises a vinylbenzyl-terminated polyphenylene ether resin, a methacrylate-terminated polyphenylene ether resin or a combination thereof.

11. The resin composition of claim 10, wherein the vinylbenzyl-terminated polyphenylene ether resin and the methacrylate-terminated polyphenylene ether resin respectively comprise a structure of Formula (III) and a structure of Formula (IV):

Formula (III)

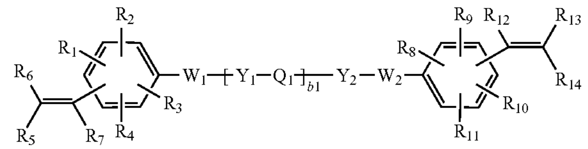

Formula (IV)

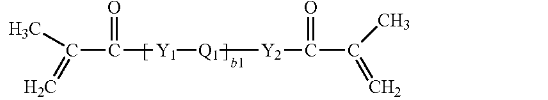

wherein $R_1$ to $R_{14}$ are individually H or —$CH_3$, and $W_1$ and $W_2$ are individually a $C_1$ to $C_3$ bivalent aliphatic group;

b1 is an integer of 0 to 8;

$Q_1$ comprises a structure of any one of Formula (B-1) to Formula (B-3) or a combination thereof:

Formula (B-1)

—$CH_2$—⟨benzene⟩—$CH_2$—

-continued

Formula (B-2)

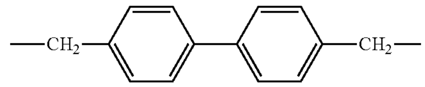

Formula (B-3)

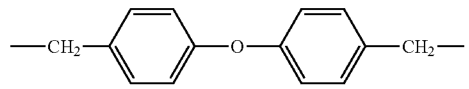

$Y_1$ and $Y_2$ independently comprise a structure of Formula (B-4):

Formula (B-4)

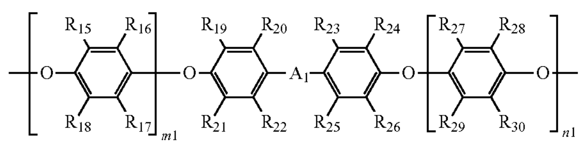

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

12. The resin composition of claim 7, further comprising amine curing agent, flame retardant, inorganic filler, curing accelerator, polymerization inhibitor, coloring agent, solvent, toughening agent, silane coupling agent or a combination thereof.

13. An article made from the resin composition of claim 7, comprising a prepreg, a resin film, a laminate or a printed circuit board.

14. The article of claim 13, having a glass transition temperature as measured by using dynamic mechanical analysis by reference to IPC-TM-650 2.4.24.4 of greater than or equal to 220° C.

15. The article of claim 13, having a copper foil peeling strength as measured by reference to IPC-TM-650 2.4.8 of greater than or equal to 3.50 lb/in.

16. The article of claim 13, having a dissipation factor at 10 GHz as measured by reference to JIS C2565 of less than or equal to 0.00350.

17. The article of claim 13, having an inner resin flow after lamination of greater than or equal to 15.0 mm.

* * * * *